United States Patent
Yukawa et al.

(10) Patent No.: US 9,948,718 B2
(45) Date of Patent: Apr. 17, 2018

(54) OPERATION CONTROL DEVICE AND OPERATION CONTROL METHOD

(71) Applicant: Mitsubishi Electric Corporation, Tokyo (JP)

(72) Inventors: Jun Yukawa, Tokyo (JP); Satoru Tokuyama, Tokyo (JP); Kensuke Ueda, Tokyo (JP); Satoko Miki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/304,730

(22) PCT Filed: Sep. 4, 2014

(86) PCT No.: PCT/JP2014/073282
§ 371 (c)(1),
(2) Date: Oct. 17, 2016

(87) PCT Pub. No.: WO2015/177944
PCT Pub. Date: Nov. 26, 2015

(65) Prior Publication Data
US 2017/0041397 A1 Feb. 9, 2017

(30) Foreign Application Priority Data
May 19, 2014 (JP) .................... 2014-103556

(51) Int. Cl.
*G06F 17/00* (2006.01)
*H04L 29/08* (2006.01)
(Continued)

(52) U.S. Cl.
CPC ............ *H04L 67/125* (2013.01); *G06F 3/165* (2013.01); *H04N 21/42204* (2013.01);
(Continued)

(58) Field of Classification Search
CPC . G06F 3/165; H04L 67/125; H04N 21/42204; H04N 21/436; H04N 21/43615; H04N 21/439
(Continued)

(56) References Cited

U.S. PATENT DOCUMENTS 6,795,404 B2 * 9/2004 Slemmer ............. H04L 12/2805
340/539.14
6,983,306 B1 * 1/2006 Sameshima ............ G05B 15/02
709/201

(Continued)

FOREIGN PATENT DOCUMENTS

JP 2001-145174 A 5/2001
JP 2003-22224 A 1/2003
(Continued)

*Primary Examiner* — Hemant Patel
(74) *Attorney, Agent, or Firm* — Birch, Stewart, Kolasch & Birch, LLP

(57) ABSTRACT

In an operation control device as a first device communicably connected to at least one second device and in an operation control method, a main controller performs a process of acquiring second device-operation information via a communication unit, a process of acquiring past second device-operation information from a storage unit, a process of selecting past second device-operation information based on similarity between current second device-operation information and the past second device-operation information acquired from the storage unit by an information acquisition unit, and a process of determining operation currently performed by the first device based on past first device-operation information stored in the storage unit while being associated with the selected past second device-operation information.

12 Claims, 14 Drawing Sheets

(51) Int. Cl.
   *H04N 21/436*   (2011.01)
   *H04N 21/439*   (2011.01)
   *G06F 3/16*     (2006.01)
   *H04N 21/422*   (2011.01)
(52) U.S. Cl.
   CPC ......... *H04N 21/436* (2013.01); *H04N 21/439* (2013.01); *H04N 21/43615* (2013.01)
(58) Field of Classification Search
   USPC .............................. 700/94; 348/14.01–14.16
   See application file for complete search history.

(56) References Cited

U.S. PATENT DOCUMENTS

| | | | |
|---|---|---|---|
| 9,577,594 B2* | 2/2017 | Li | G06F 3/165 |
| 2003/0009760 A1 | 1/2003 | Sakamoto et al. | |
| 2006/0031460 A1 | 2/2006 | Araki et al. | |
| 2007/0124424 A1* | 5/2007 | Matsuda | H04L 12/2818 |
| | | | 709/217 |

FOREIGN PATENT DOCUMENTS

| | | |
|---|---|---|
| JP | 2004-185607 A | 7/2004 |
| JP | 2004-258809 A | 9/2004 |
| JP | 2007-110388 A | 4/2007 |
| JP | 2010-74651 A | 4/2010 |
| JP | 2010-93393 A | 4/2010 |
| JP | 2012-239004 A | 12/2012 |

* cited by examiner

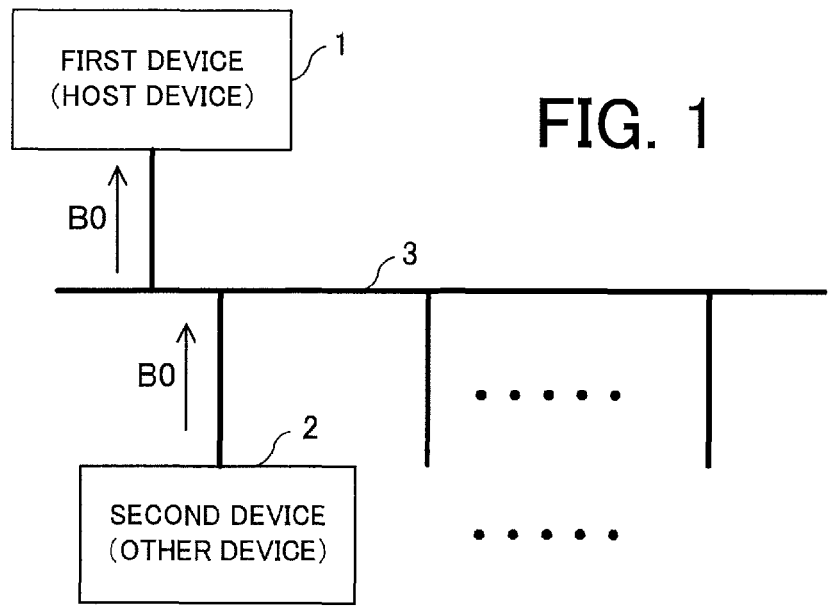
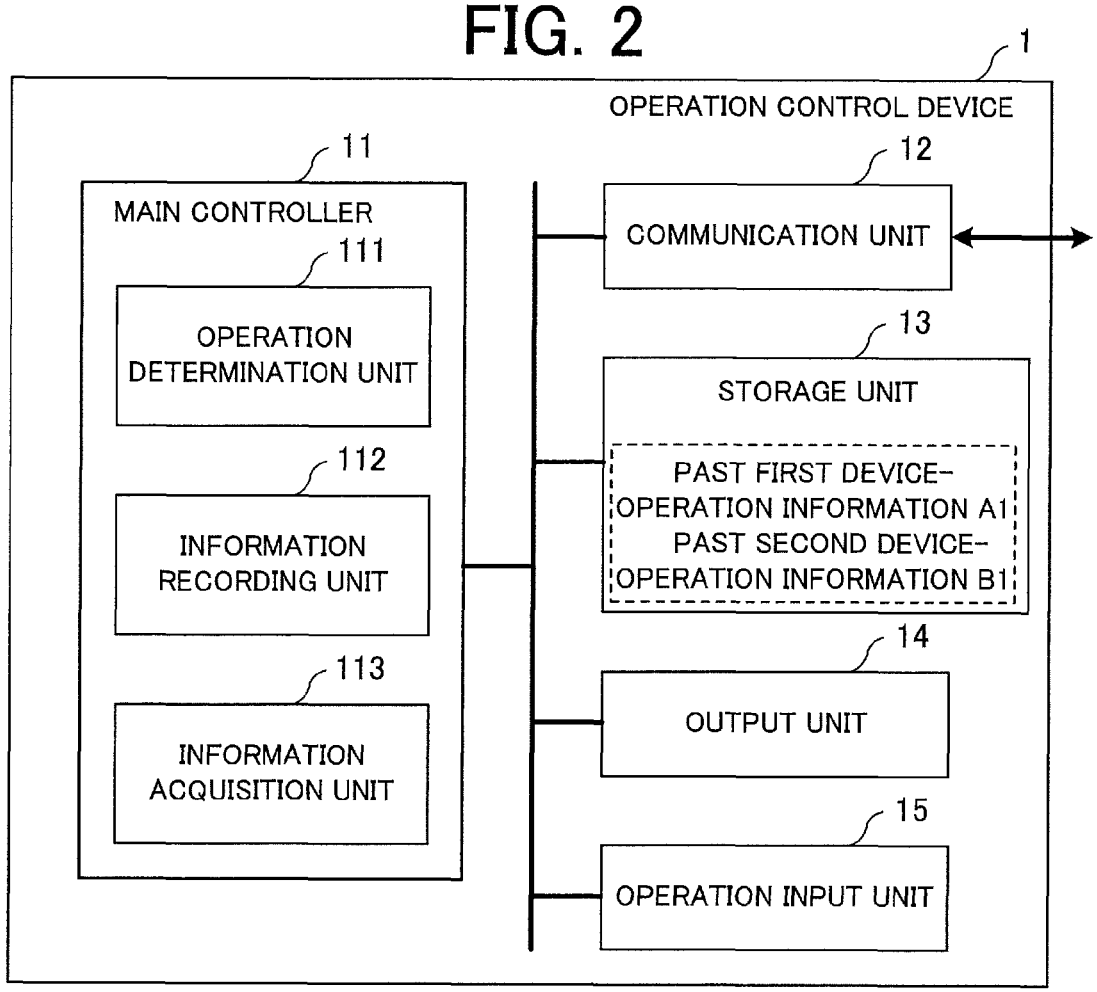

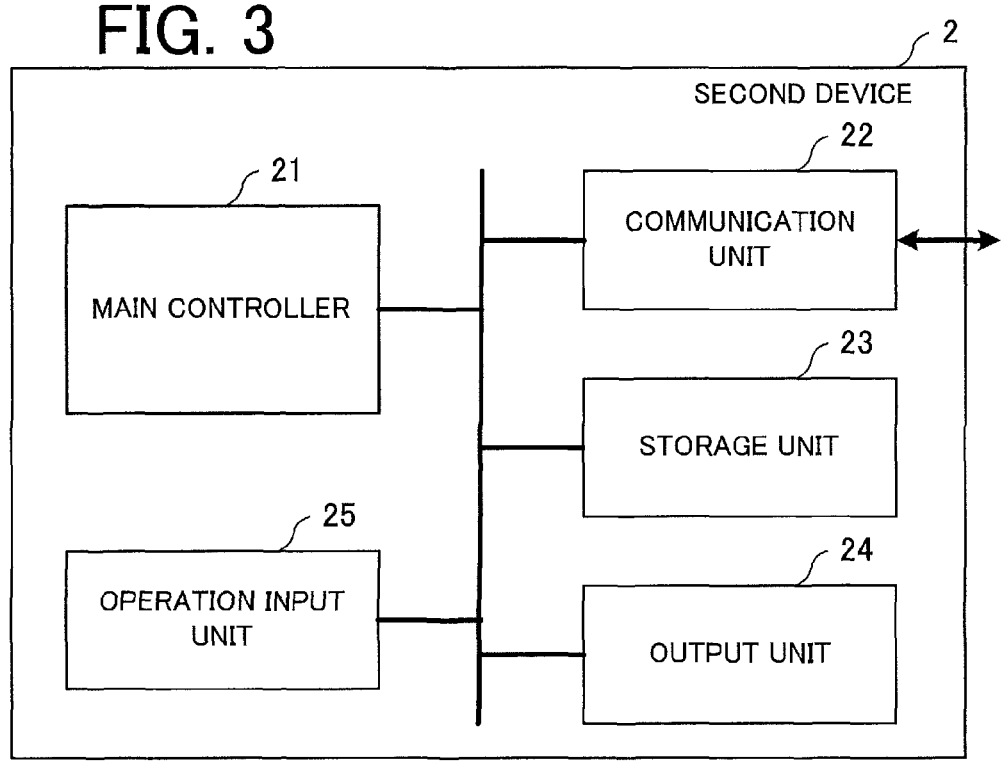

| FIRST DEVICE-OPERATION INFORMATION A1 (FIRST TELEVISION SET) | SECOND DEVICE-OPERATION INFORMATION B11 (SECOND TELEVITION SET) | SECOND DEVICE-OPERATION INFORMATION B12 (EXTRACTOR FAN) | ... |
|---|---|---|---|
| VOLUME LEVEL 5 | POWER OFF | POWER OFF | ... |
| VOLUME LEVEL 10 | POWER ON VOLUME LEVEL 10 | POWER OFF | ... |
| VOLUME LEVEL 15 | POWER ON VOLUME LEVEL 15 | POWER OFF | ... |
| VOLUME LEVEL 20 | POWER ON VOLUME LEVEL 20 | POWER OFF | ... |
| VOLUME LEVEL 10 | POWER ON VOLUME LEVEL 5 | POWER ON | ... |
| VOLUME LEVEL 15 | POWER ON VOLUME LEVEL 10 | POWER ON | ... |
| VOLUME LEVEL 20 | POWER ON VOLUME LEVEL 15 | POWER ON | ... |
| ... | ... | ... | ... |

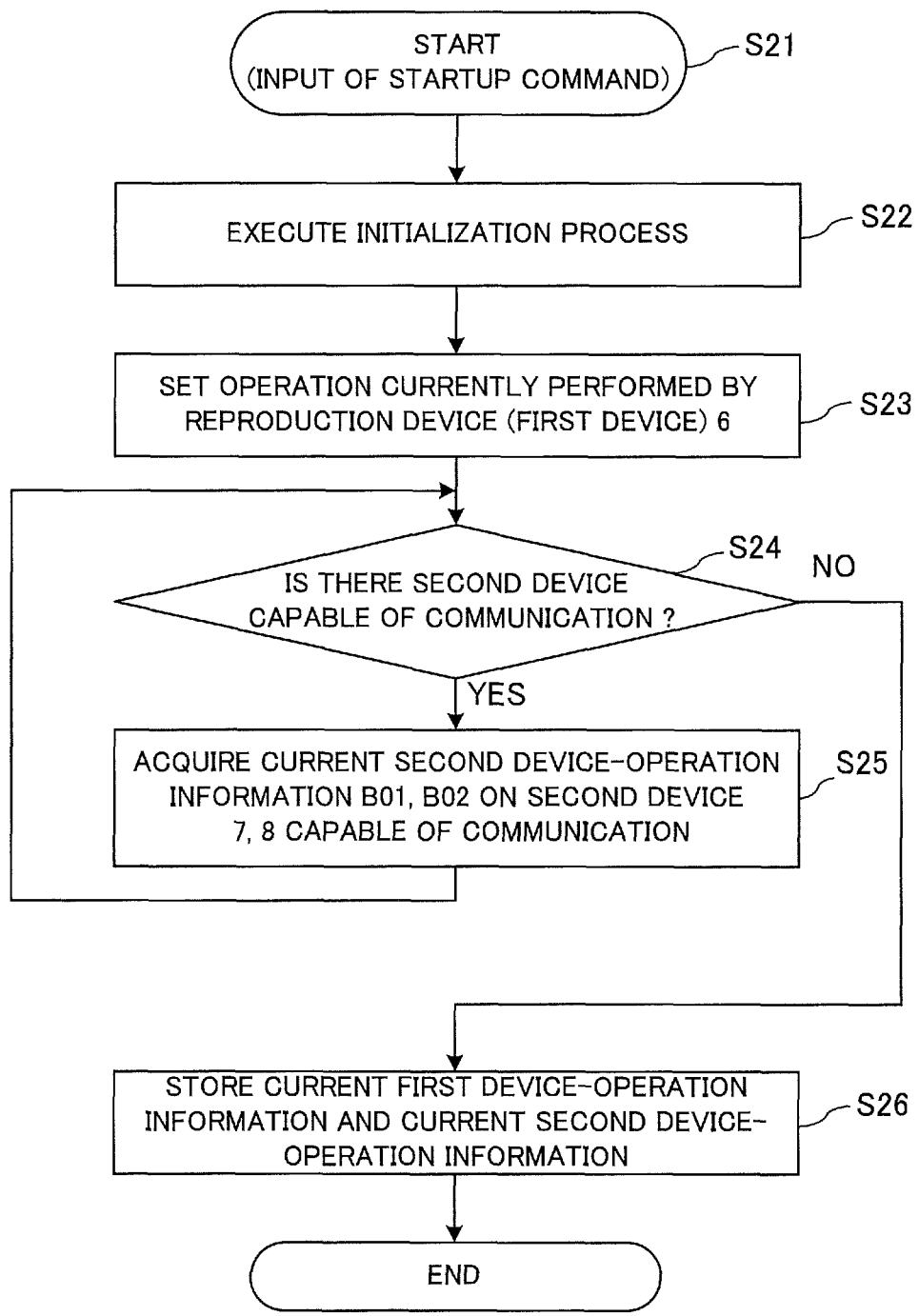

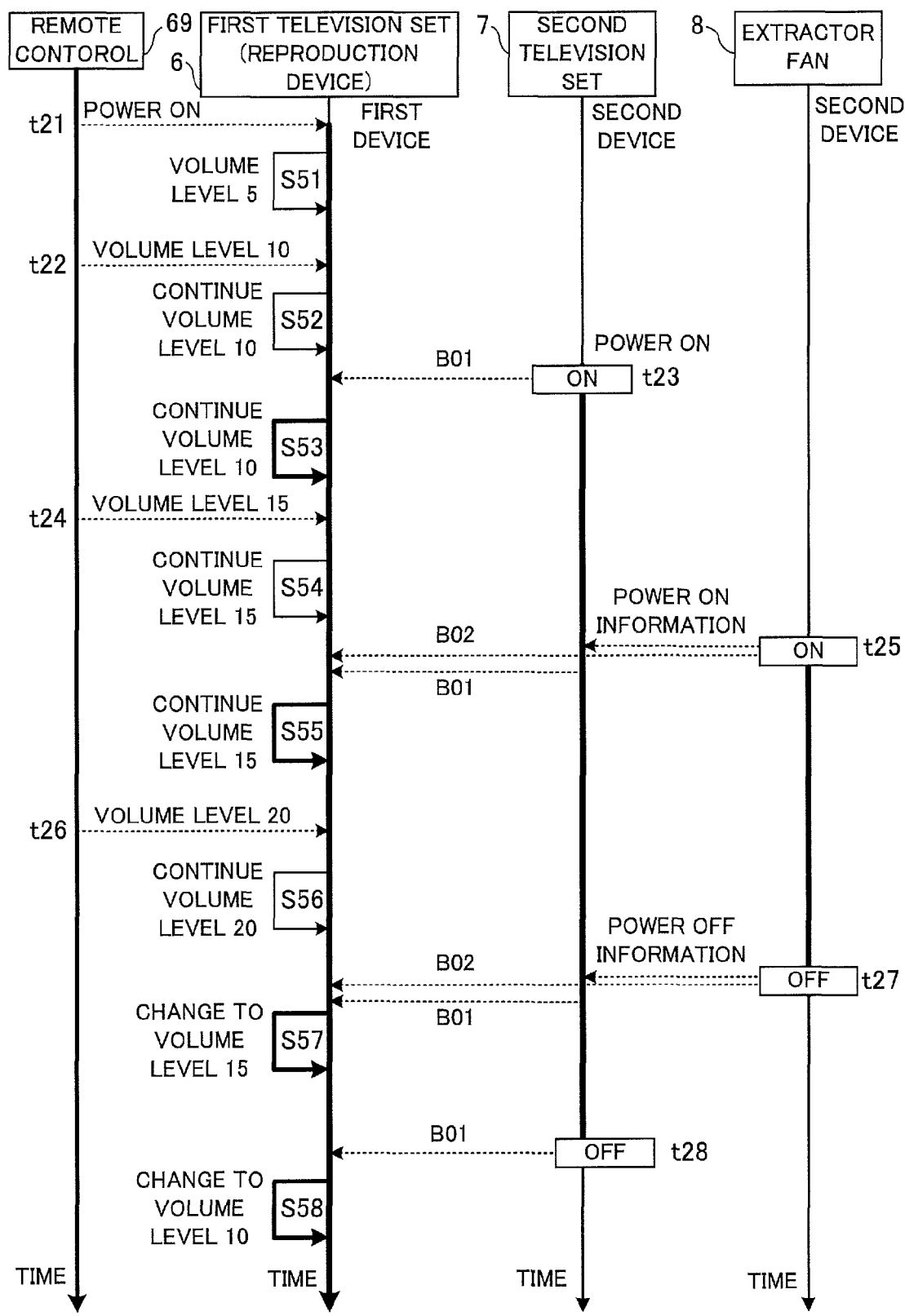

OPERATION CONTROL DEVICE AND OPERATION CONTROL METHOD

TECHNICAL FIELD

The present invention relates to an operation control device and an operation control method capable of setting the operation of a first device based on current and past second device-operation information on a communicably connected second device and past first device-operation information on the first device.

BACKGROUND ART

In recent years, various types of home electric appliances (electronic devices) such as television sets, refrigerators, washing machines, air conditioners, rice cookers, and microwave ovens are used in houses. In addition to displaying picture, indicator lamps, and electronic buzzer sound, there is artificially synthesized voice or sound as means for informing a user about the operation of the home electric appliances. Thus, there are cases where sounds emitted from a plurality of home electric appliances interfere with each other. For example, there is a case where it is hard to hear sound from the television set, because of the interference of sound generated from a television set in a living room and sound generated from a cooking appliance in a kitchen for informing of the end of cooking. Further, there is a case where it is hard to hear sound from the television set, because of operating sound of home electric appliances such as wind noise generated from fans of an air conditioner, an electric fan, and an extractor fan, water splash noise generated from a dishwashing machine, and motor noise generated from a compressor motor of a refrigerator.

A microcomputer for a home electric appliance is capable of not only controlling the home electric appliance which is a host device (first device) but also implementing a communication function with a home electric appliance which is the other device (second device). There have been proposed systems for controlling the operation of the first device in conjunction with the operation of the second device by using such a communication function, such as HEMS (Home Energy Management System) which is an energy management system for a house.

Further, to prevent an interference between sounds from first and second devices arranged next to each other, there has been proposed a system in which normal volume level control is performed on the first device when only the first device is in operation and the volume levels of the first and second devices are set at predetermined low volume levels (non-interference volume levels) when both of the first and second devices are in operation (see Patent Reference 1, for example).

PRIOR ART REFERENCE

Patent Reference

Patent Reference 1: Japanese Patent Application Publication No. 2010-74651 (Paragraphs 0118-0132 and FIG. 9, for example)

SUMMARY OF THE INVENTION

Problem to be Solved by the Invention

In the above-described conventional system, however, when the operation of the second device is started during the operation of the first device, the control for changing the volume level of the first device to the predetermined low volume level (non-interference volume level) is conducted irrespective of the volume level of the first device before the start of the operation of the second device. Thus, the conventional system has a problem in that the volume of the sound from the first device can become too low for the user and it can be hard to hear.

Accordingly, the present invention has been made to solve the problem of the above-described conventional technology. An object of the present invention is to provide an operation control device and an operation control method capable of appropriately setting operation of a first device based on current and past second device-operation information on a communicably connected second device and past first device-operation information on the first device.

Means for Solving the Problem

An operation control device according to an aspect of the present invention is an operation control device as a first device communicably connected to at least one second device. The operation control device includes: an operation determination unit configured to determine first device-operation information indicating operation currently performed by the first device; a communication unit configured to receives second device-operation information indicating operation performed by the second device; a storage unit configured to store information; an information recording unit configured to store the first device-operation information determined by the operation determination unit and the second device-operation information received by the communication unit in the storage unit while associating the first device-operation information and the second device-operation information with each other; and an information acquisition unit configured to acquire the first device-operation information and the second device-operation information stored in the storage unit as past first device-operation information and past second device-operation information. The operation determination unit performs: a process of acquiring the second device-operation information received via the communication unit as current second device-operation information; a process of selecting past second device-operation information based on similarity between the current second device-operation information and the past second device-operation information acquired from the storage unit by the information acquisition unit; and a process of determining operation currently performed by the first device based on the past first device-operation information stored in the storage unit while being associated with the selected past second device-operation information.

An operation control device according to another aspect of the present invention is an operation control device which is communicably connected to a first device and at least one second device and controls operation of the first device. The operation control device includes: an operation determination unit configured to determine current first device-operation information which is first device-operation information indicating operation currently performed by the first device; a communication unit configured to receive the first device-operation information indicating operation performed by the first device and second device-operation information indicating operation performed by the second device; a storage unit configured to store information; an information recording unit configured to store the first device-operation information and the second device-operation information received by the communication unit in the storage unit while associating the first device-operation information and the second device-operation information with each other; and an information acquisition unit configured to acquire the first device-operation information and the second device-operation information stored in the storage unit as past first device-operation information and past second device-operation information. The operation determination unit performs: a process of acquiring the second device-operation information received via the communication unit as current second device-operation information; a process of selecting past second device-operation information based on similarity between the current second device-operation information and the past second device-operation information acquired from the storage unit by the information acquisition unit; and a process of transmitting a command signal, for setting the operation of the first device based on the past first device-operation information stored in the storage unit while being associated with the selected past second device-operation information, to the first device via the communication unit.

An operation control method according to another aspect of the present invention is an operation control method executed by a first device communicably connected to at least one second device via a communication unit. The operation control method includes the steps of: acquiring the second device-operation information received via the communication unit as current second device-operation information; acquiring past second device-operation information from a storage unit configured to store past first device-operation information indicating operation previously performed by the first device and the past second device-operation information indicating operation previously performed by the second device while associating the past first device-operation information and the past second device-operation information with each other; selecting past second device-operation information based on similarity between the current second device-operation information acquired via the communication unit and the past second device-operation information acquired from the storage unit; and setting operation currently performed by the first device by setting current first device-operation information based on the past first device-operation information stored in the storage unit while being associated with the selected past second device-operation information.

Effects of the Invention

According to the operation control device and the operation control method in the present invention, past second device-operation information having maximum similarity concerning the current second device-operation information acquired via the communication unit is selected from the past second device-operation information stored in the storage unit and the operation currently performed by the first device is set based on past first device-operation information stored while being associated with the selected past second device-operation information. Thus, an advantageous effect can be achieved in that the operation of the first device can be set appropriately.

BRIEF DESCRIPTION OF THE DRAWINGS

FIG. 1 is a system configuration diagram schematically showing a control system including an operation control device (first device, host device) according to a first embodiment of the present invention.

FIG. 2 is a block diagram schematically showing the configuration of the operation control device (first device) shown in FIG. 1.

FIG. 3 is a block diagram schematically showing the configuration of a second device (other device) shown in FIG. 1.

FIG. 4 is a diagram showing an example of operation information stored in a storage unit of the operation control device shown in FIG. 2.

FIG. 13 is a diagram showing an example of operation information stored in a storage unit of the reproduction device shown in FIG. 11.

FIG. 14 is a flowchart schematically showing a process at the time of startup performed by the reproduction device according to the third embodiment.

FIG. 17 is a sequence diagram schematically showing an example of the operation of the control system shown in FIG. 10.

MODE FOR CARRYING OUT THE INVENTION

First Embodiment

Figure 5:
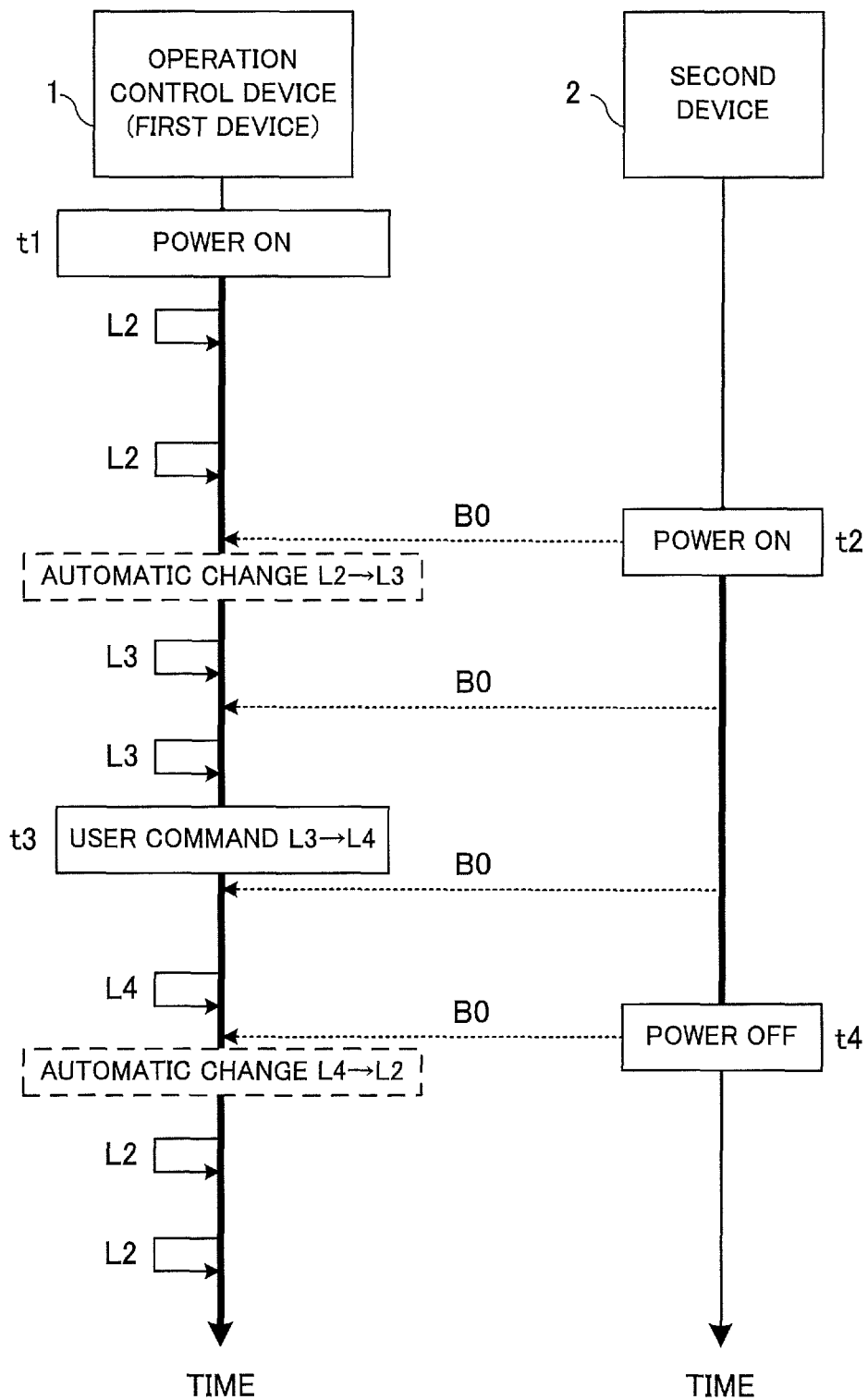
FIG. 5 is a sequence diagram schematically showing an example of the operation of the control system shown in FIG. 1.

FIG. 1 is a system configuration diagram schematically showing a control system including an operation control device (first device, host device) 1 according to a first embodiment of the present invention. The operation control device 1 shown in FIG. 1 is a device which is capable of executing an operation control method according to the first embodiment. As shown in FIG. 1, the operation control device 1 according to the first embodiment is communicably connected to a second device (other device) 2 via a communication network 3. The operation control device 1 and the second device 2 are, for example, home electric appliances (household electronic devices) and the communication network 3 is, for example, a wired or wireless home network. Although the single second device communicably connected to the operation control device 1 is shown in FIG. 1, there may be two or more second devices. Each of the first and second devices is, for example, an audio-visual device (television set, radio, audio device, video recorder, optical disc player, etc.), a kitchen appliance (refrigerator, rice cooker, microwave oven, dishwashing machine, extractor fan, etc.), a home appliance (washing machine, air conditioner, air cleaner, electric fan, vacuum cleaner, etc.), a room illumination device, or the like.

FIG. 2 is a block diagram schematically showing the configuration of the operation control device (first device) 1 shown in FIG. 1. As shown in FIG. 2, the operation control device 1 includes a main controller 11 for controlling the operation of the entire device, a communication unit 12, and a storage unit 13 for storing information. The main controller 11 includes an operation determination unit 111, an information recording unit 112, and an information acquisition unit 113. The communication unit 12 performs communication via the communication network 3 with a device connected to the communication network 3, for example, the second device 2. The operation control device 1 may include an output unit 14 configured to output video or sound. The output unit 14 configured to output video or sound may include, for example, a display unit configured to display video and an audio output unit such as a speaker configured to output sound. The output unit 14 may be a circuit configured to output a video signal or an audio signal. The operation control device 1 may include an operation input unit 15 used to input a user command. The operation input unit 15 is composed of, for example, an operation button, a remote control and a remote control reception unit, a keyboard, a mouse, a touch panel, and so on.

The operation determination unit 111 performs a process for determining current first device-operation information which is first device-operation information indicating operation currently performed by the operation control device 1.

The information recording unit 112 performs a process for storing the current first device-operation information A0 determined by the operation determination unit 111 and current second device-operation information B0 received by the communication unit 12 at that time in the storage unit 13 while associating the current first device-operation information A0 and the current second device-operation information B0 with each other, or a process for updating the information stored in the storage unit 13 by information associating the current first device-operation information A0 and the current second device-operation information B0 with each other.

The information acquisition unit 113 performs a process for acquiring past first device-operation information A1 and past second device-operation information B1 stored in the storage unit 13. Incidentally, the current first device-operation information A0 and the current second device-operation information B0 stored in the storage unit 13 by the information recording unit 112 have became past operation information caused by the passage of time, and thus are referred to as past first device-operation information A1 and past second device-operation information B1 at the time point of being read out by the information acquisition unit 113.

The operation determination unit 111 performs a process for acquiring the current second device-operation information B0 via the communication unit 12 and a process for having the information acquisition unit 113 acquire the past second device-operation information B1 from the storage unit 13. Thereafter, the operation determination unit 111 performs a process for selecting past second device-operation information B1a having maximum similarity concerning the current second device-operation information B0 acquired via the communication unit 12, from the past second device-operation information B1 acquired from the storage unit 13 by the information acquisition unit 113 and a process for setting the current operation of the operation control device (first device) 1 based on the past first device-operation information A1 stored in the storage unit 13 while being associated with the selected past second device-operation information B1a.

FIG. 3 is a block diagram schematically showing the configuration of the second device (other device) 2 shown in FIG. 1. As shown in FIG. 3, the second device 2 includes a main controller 21 configured to control the operation of the entire device, a communication unit 22 configured to perform communication via the communication network 3, a storage unit 23 configured to store information, an output unit 24 configured to output signals such as a video signal or an audio signal, and an operation input unit 25 used to input a user command. Incidentally, the configuration of the second device 2 is not limited to the example shown in FIG. 3, and the second device 2 may be configured differently as long as the second device 2 is a device capable of notifying the operation control device 1 of the current second device-operation information B0, for example, power ON information or power OFF information on the second device 2, the volume level outputted from the output unit 24, and so on.

FIG. 4 is a diagram showing an example of the operation information stored in the storage unit 13 of the operation control device 1 shown in FIG. 2. As shown in FIG. 4, the storage unit 13 stores the past first device-operation information A1 and the past second device-operation information B1 while associating them with each other. In the example of FIG. 4, pieces of operation information in the same row are pieces of information associated with each other. The output level is, for example, the volume level. The output level increases in the order of output levels L2, L3, and L4. The output level increases in the order of output levels M1, M2, M3, and M4. The example of FIG. 4 is just an example, and the information stored in the storage unit 13 may be other types of operation information.

FIG. 5 is a sequence diagram schematically showing an example of the operation of the control system shown in FIG. 1. In FIG. 5, when a user command for turning on the power is inputted to the operation control device 1 (time t1), the operation control device 1, for example, starts up with its initial value set to the output level L2 at the time of the previous startup. The initial value may also be a value set according to a user command.

Subsequently, when the power of the second device 2 is turned on (ON) and the second device-operation information B0 is received from the second device 2 (time t2), the operation control device 1 performs a process for setting the operation with the operation determination unit 111. For example, when the current second device-operation information B0 indicates "POWER ON, OUTPUT LEVEL M3", the operation determination unit 111 of the operation control device 1 selects past second device-operation information B1 having maximum similarity concerning the current second device-operation information B0 indicating "POWER ON, OUTPUT LEVEL M3" from the operation information stored in the storage unit 13. In the example of FIG. 4, the information having maximum similarity concerning the current second device-operation information B0 is information indicated by reference character 13a and having the same contents, that is, the past second device-operation information B1 indicating "POWER ON, OUTPUT LEVEL M3". Thus, the operation determination unit 111 of the operation control device 1 selects the past second device-operation information B1a indicated by the reference character 13a in FIG. 4, acquires "OUTPUT LEVEL L3" which is the past first device-operation information A1a associated with the selected information, and changes the operation of the operation control device 1 to the output level L3. Incidentally, distance values of the current second device-operation information B0 and the past second device-operation information B1 can be calculated by using a preset distance function, and the past second device-operation information having a minimum distance value calculated by using the preset distance function can be determined as the past second device-operation information B1 having maximum similarity concerning the current second device-operation information B0. Concrete examples of distance functions will be explained in a third embodiment later.

Subsequently, the operation control device 1 changes the output level from L3 to L4 in accordance with a user command (time t3).

Thereafter, when the power of the second device 2 is turned off (OFF) and the second device-operation information B0 is received from the second device 2 (time t4), the operation control device 1 performs the process for setting the operation with the operation determination unit 111. For example, when the current second device-operation information B0 indicates "POWER OFF", the operation determination unit 111 of the operation control device 1 selects past second device-operation information B1 having maximum similarity concerning the current second device-operation information B0 indicating "POWER OFF" from the operation information stored in the storage unit 13. In the example of FIG. 4, the information having maximum similarity concerning the current second device-operation information B0 is information indicated by reference character 13b and having the same contents, that is, the past second device-operation information B1 indicating "POWER OFF". Thus, the operation determination unit 111 of the operation control device 1 selects the past second device-operation information B1 indicated by the reference character 13b, acquires "OUTPUT LEVEL L2" which is the past first device-operation information A1 associated with the selected information, and changes the operation of the operation control device 1 to the output level L2.

Figure 6:
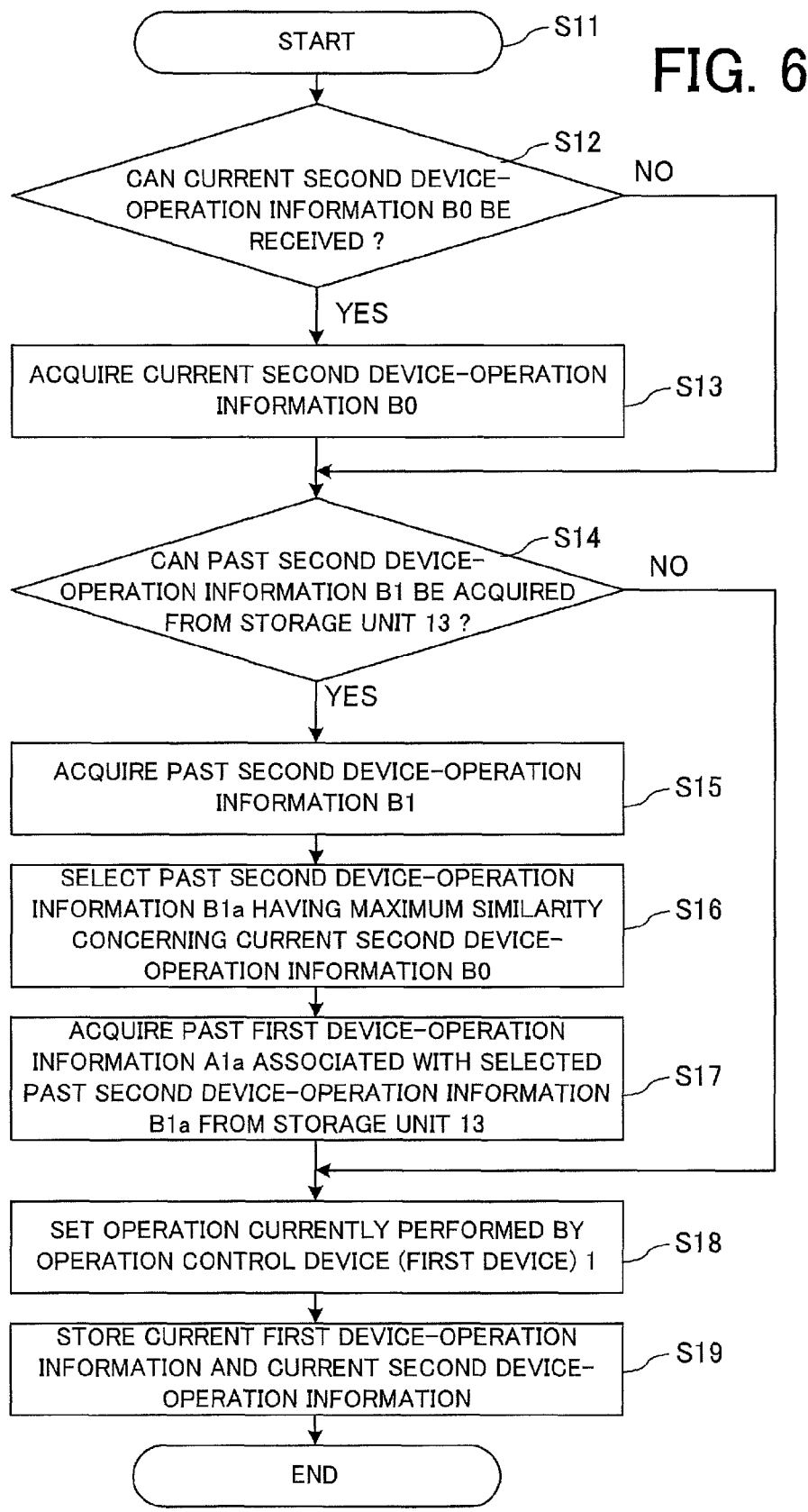
FIG. 6 is a flowchart showing a process for calculating first device-operation information performed by a main controller of the operation control device according to the first embodiment.

FIG. 6 is a flowchart schematically showing a process for setting the operation of the operation control device 1 according to the first embodiment. In FIG. 6, when the operation control device 1 starts the operation setting process (step S11), the operation control device 1 checks whether or not there exists current second device-operation information B0 indicating operation currently performed by the second device 2 (step S12). When there is no notification of update of the current second device-operation information from the second device 2 or when the current second device-operation information B0 on the second device 2 capable of communication is acquired (step S13), the operation control device 1 judges whether or not the past second device-operation information B1 can be acquired from the storage unit 13 (step S14).

When the past second device-operation information B1 can be acquired from the storage unit 13 in the step S14, the operation control device 1 acquires at least a piece of the past second device-operation information B1 (step S15), selects past second device-operation information B1a having maximum similarity concerning the current second device-operation information B0 from the acquired information (step S16), and acquires, from the storage unit 13, past first device-operation information A1a associated with the selected past second device-operation information B1a (step S17). Incidentally, an example of a similarity calculation method in cases where there exists no past second device-operation information B1 identical with the current second device-operation information B0 will be explained in the third embodiment later.

Subsequently, the operation control device 1 sets the operation currently performed by the operation control device 1 based on the selected past first device-operation information A1a (step S18). Further, when the past second device-operation information B1 cannot be acquired from the storage unit 13 in the step S14, the operation control device 1 sets the operation currently performed by the operation control device 1 based on the past first device-operation information A1a (step S18).

Subsequently, the operation control device 1 stores the current second device-operation information B0 and the current first device-operation information A0 in the storage unit 13 (step S19).

As described above, according to the operation control device 1 and the operation control method in the first embodiment, the past second device-operation information B1a having maximum similarity concerning the current second device-operation information B0 acquired via the communication unit 12 is selected from the past second device-operation information B1 stored in the storage unit 13, and the operation currently performed by the operation control device 1 is set based on the past first device-operation information A1a stored while being associated with the selected past second device-operation information B1a. Therefore, the operation of the operation control device 1 can be set appropriately.

Second Embodiment

Figure 7:
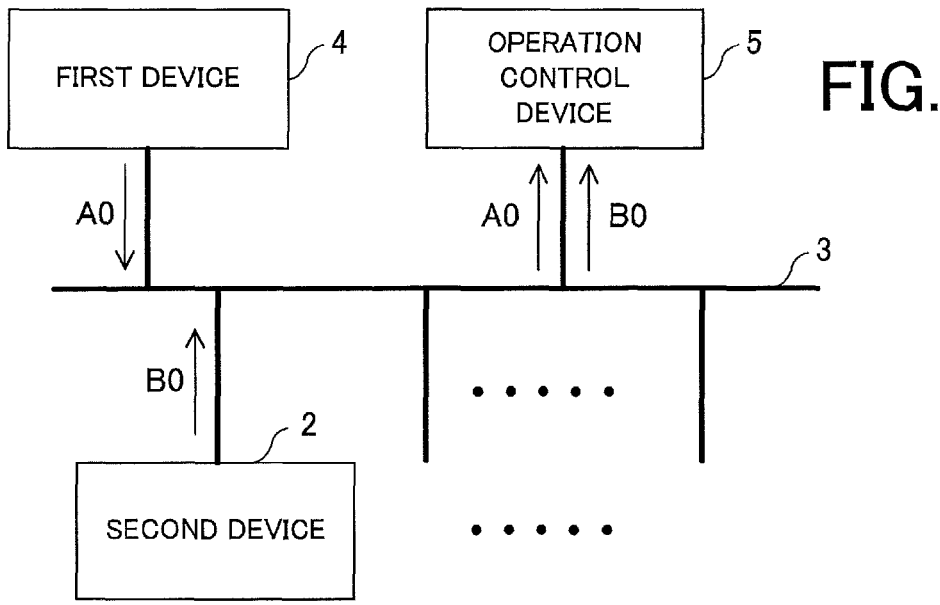
FIG. 7 is a system configuration diagram schematically showing a control system including an operation control device according to a second embodiment of the present invention.

FIG. 7 is a system configuration diagram schematically showing a control system including an operation control device 5 according to a second embodiment of the present invention. The operation control device 5 shown in FIG. 7 is a device capable of executing an operation control method according to the second embodiment. Components in FIG. 7 identical or corresponding to components shown in FIG. 1 are assigned the same reference characters as the reference characters shown in FIG. 1. In the first embodiment (FIG. 1), the first device which is an object of control has the function as the operation control device 1. In the second embodiment (FIG. 7), a first device 4 which is an object of control and the operation control device 5 are separate devices capable of communicating with each other via the communication network 3. In other respects, the second embodiment is the same as the first embodiment. The first device 4 and the second device 2 are, for example, home electric appliances (household electronic devices).

Figure 8:
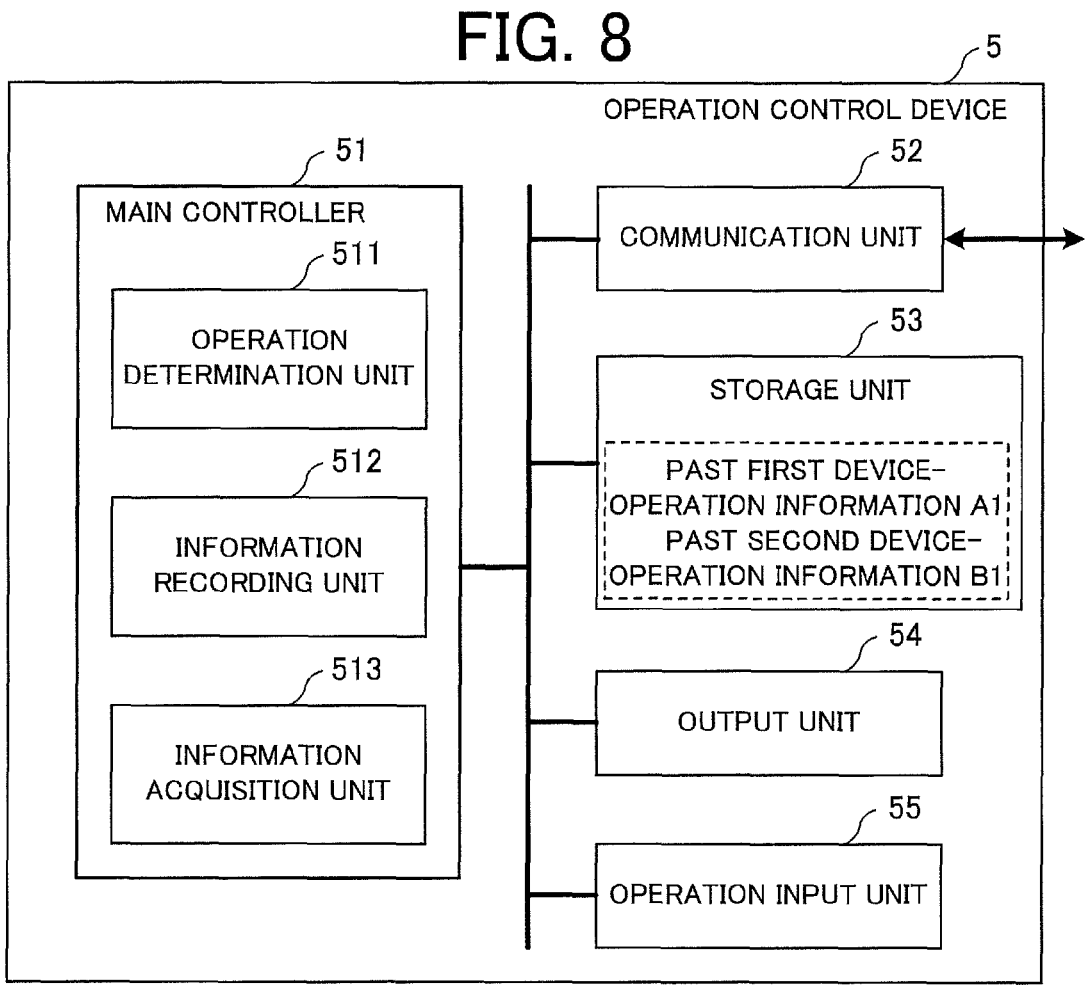
FIG. 8 is a block diagram schematically showing the configuration of the operation control device shown in FIG. 7.

FIG. 8 is a block diagram schematically showing the configuration of the operation control device 5 shown in FIG. 7. As shown in FIG. 8, the operation control device 5 includes a main controller 51 configured to control the operation of the entire device, a communication unit 52, and a storage unit 53 configured to store information. The main controller 51 includes an operation determination unit 511, an information recording unit 512, and an information acquisition unit 513. The communication unit 52 performs communication via the communication network 3 with the first device 4 and the second device 2 connected to the communication network 3. The operation control device 5 may include, for example, an output unit 54 configured to output a signal such as a video signal or an audio signal, and an operation input unit 55 used to input a user command.

The operation determination unit 511 of the operation control device 5 performs a process for determining current first device-operation information which is first device-operation information indicating the operation currently performed by the first device 4. The information recording unit 512 of the operation control device 5 performs a process for storing the current first device-operation information A0 determined by the operation determination unit 511 and current second device-operation information B0 received by the communication unit 52 at that time in the storage unit 53 while associating the current first device-operation information A0 and the current second device-operation information B0 with each other, or a process for updating the information stored in the storage unit 53. The information acquisition unit 513 of the operation control device 5 performs a process for acquiring past first device-operation information A1 and past second device-operation information B1 stored in the storage unit 53. Incidentally, the current first device-operation information A0 and the current second device-operation information B0 stored in the storage unit 53 have become past information after the passage of time, and thus are referred to as past first device-operation information A1 and past second device-operation information B1 at the time point of being read out.

The operation determination unit 511 of the operation control device 5 performs a process for acquiring second device-operation information as the current second device-operation information B0 via the communication unit 52, a process for having the information acquisition unit 513 acquire second device-operation information as the past second device-operation information B1 from the storage unit 53, a process for selecting past second device-operation information B1a having maximum similarity concerning the current second device-operation information B0 acquired via the communication unit 52 from the past second device-operation information B1 acquired from the storage unit 53 by the information acquisition unit 513, and a process for setting the operation currently performed by the first device 4 based on past first device-operation information A1 which is first device-operation information stored in the storage unit 53 while being associated with the selected past second device-operation information by sending a command signal to the first device 4.

The first device 4 shown in FIG. 7 has a configuration similar to that of the second device 2 shown in FIG. 3. The first device 4 sets its current operation in accordance with the command signal from the operation control device 5.

Figure 9:
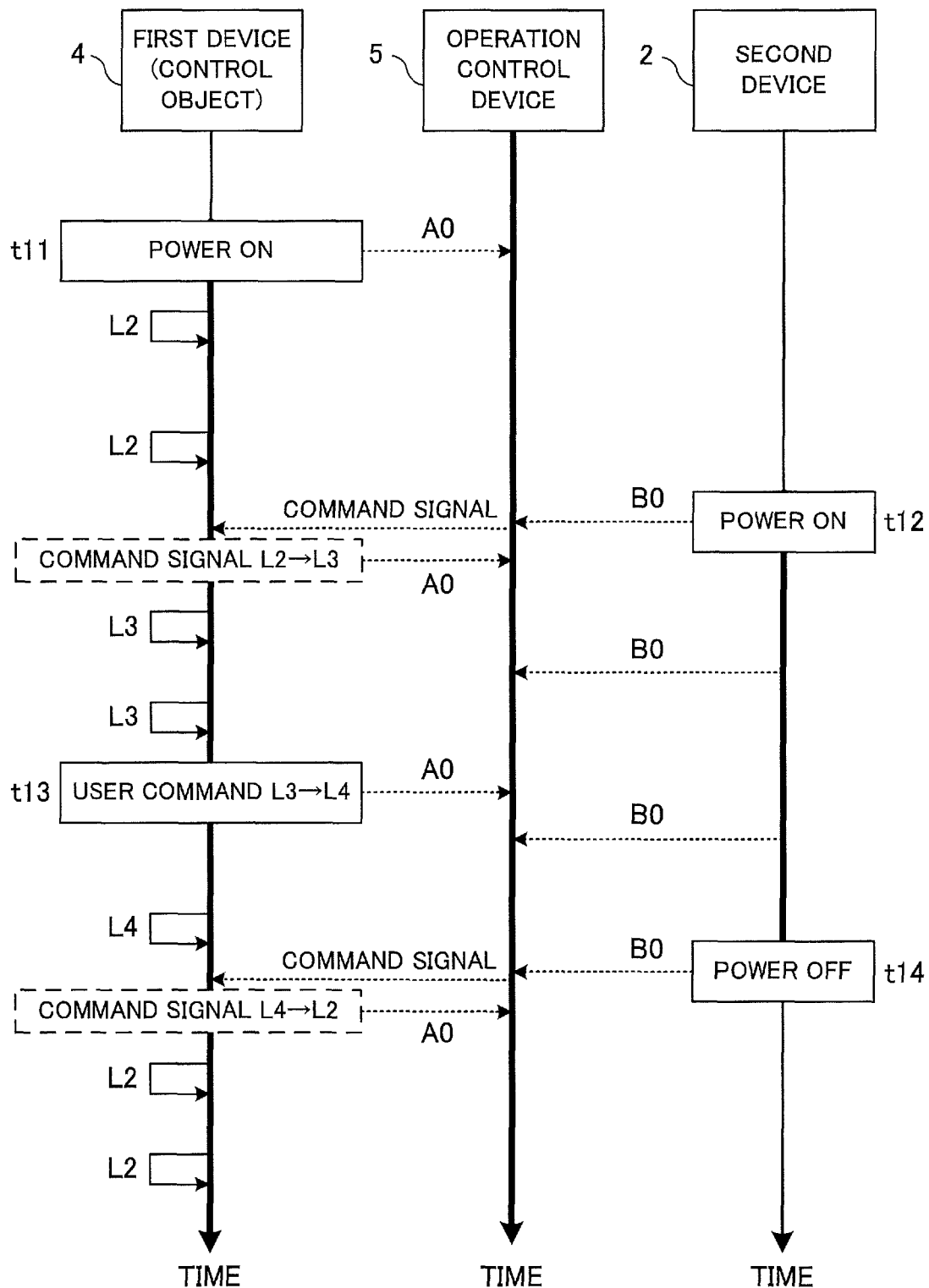
FIG. 9 is a sequence diagram schematically showing an example of the operation of the control system shown in FIG. 7.

FIG. 9 is a sequence diagram schematically showing an example of the operation of the control system shown in FIG. 7. In FIG. 9, when a user command for turning on the power is inputted to the first device 4 which is an object of control (time t11), the first device 4 starts up with its initial value set to an output level L2 at the time of the previous startup. When the power of the first device 4 is turned on (ON), the operation control device 5 receives first device-operation information A10 from the first device 4.

Subsequently, when the power of the second device 2 is turned on (ON) and the second device-operation information B0 is received from the second device 2 (time t12), the operation control device 5 performs a process for setting the operation with the operation determination unit 511. For example, when the current second device-operation information B0 indicates "POWER ON, OUTPUT LEVEL M3", the operation determination unit 511 of the operation control device 5 selects past second device-operation information B1 having maximum similarity concerning the current second device-operation information B0 indicating "POWER ON, OUTPUT LEVEL M3" from the operation information stored in the storage unit 53. In the example of FIG. 4, the information having maximum similarity concerning the current second device-operation information B0 is the information indicated by the reference character 13a and having the same contents, that is, the past second device-operation information B1 indicating "POWER ON, OUTPUT LEVEL M3". Thus, the operation determination unit 511 of the operation control device 5 selects the past second device-operation information B1 indicated by the reference character 13a, acquires "OUTPUT LEVEL L3" which is the past first device-operation information A1 associated with the selected information, and changes the operation of the first device 4 to the output level L3.

Subsequently, the first device 4 changes the output level from L3 to L4 in accordance with a user command (time t13).

Thereafter, when the power of the second device 2 is turned off (OFF) and the second device-operation information B0 is received from the second device 2 (time t14), the operation control device 5 performs the process for setting the operation of the first device 4 with the operation determination unit 511. For example, when the current second device-operation information B0 indicates "POWER OFF", the operation determination unit 511 of the operation control device 5 selects past second device-operation information B1 having maximum similarity concerning the current second device-operation information B0 indicating "POWER OFF" from the operation information stored in the storage unit 53. In the example of FIG. 4, the information having maximum similarity concerning the current second device-operation information B0 is the information indicated by the reference character 13b and having the same contents, that is, the past second device-operation information B1 indicating "POWER OFF". Thus, the operation determination unit 511 of the operation control device 5 selects the past second device-operation information B1 indicated by the reference character 13b, acquires "OUTPUT LEVEL L2" which is the past first device-operation information A1 associated with the selected information, and transmits a command signal for commanding to change the operation of the first device 4 into the output level L2.

As described above, according to the operation control device 5 and the operation control method in the second embodiment, the past second device-operation information B1a having maximum similarity concerning the current second device-operation information B0 acquired via the communication unit 52 is selected from the past second device-operation information B1 stored in the storage unit 53, and the operation currently performed by the first device 4 is set based on the past first device-operation information A1a stored while being associated with the selected past second device-operation information B1a. Therefore, the operation of the first device 4 can be set appropriately.

Third Embodiment

Figure 10:
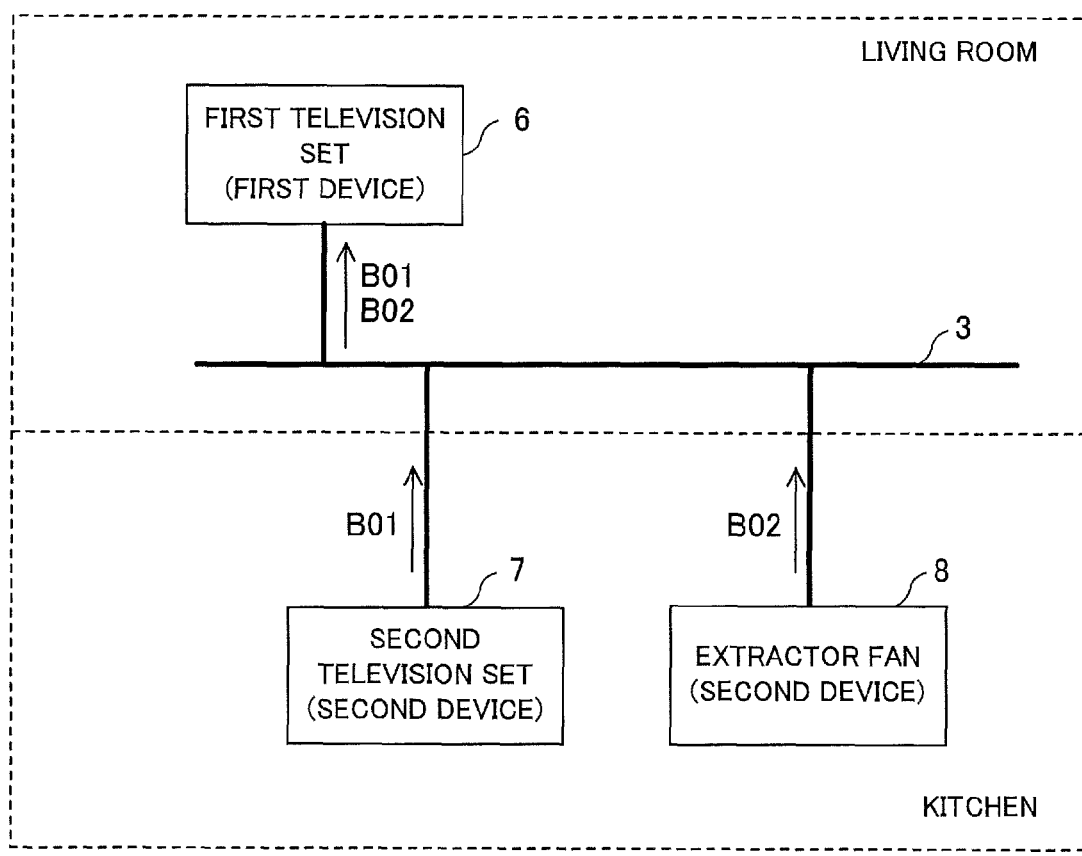
FIG. 10 is a system configuration diagram schematically showing a control system including a first television set (first device, host device) as a reproduction device according to a third embodiment of the present invention.

FIG. 10 is a system configuration diagram schematically showing a control system including a first television set (first device, host device) as a reproduction device 6 according to a third embodiment of the present invention. The reproduction device 6 shown in FIG. 10 has a function as an operation control device configured to control the operation of the reproduction device 6 itself. Further, the reproduction device 6 shown in FIG. 10 is a device capable of executing a reproduction method according to the third embodiment. The third embodiment is a concrete example in which the operation control device 1 according to the first embodiment is applied to the reproduction device 6 configured to reproduce a video signal or an audio signal. As shown in FIG. 10, the reproduction device 6 according to the third embodiment is installed in a living room of a house, and a second television set 7 and an extractor fan 8 as second devices (other devices) are installed in a kitchen of the same house. The second television set 7 and the extractor fan 8 are communicably connected to the reproduction device 6 via the communication network 3. The reproduction device 6 acquires current second device-operation information B01 from the second television set 7 and acquires current second device-operation information B02 from the extractor fan 8. While the two second devices communicably connected to the reproduction device 6 are shown in FIG. 10, the number of second devices may be one, or three or more.

Figure 11:
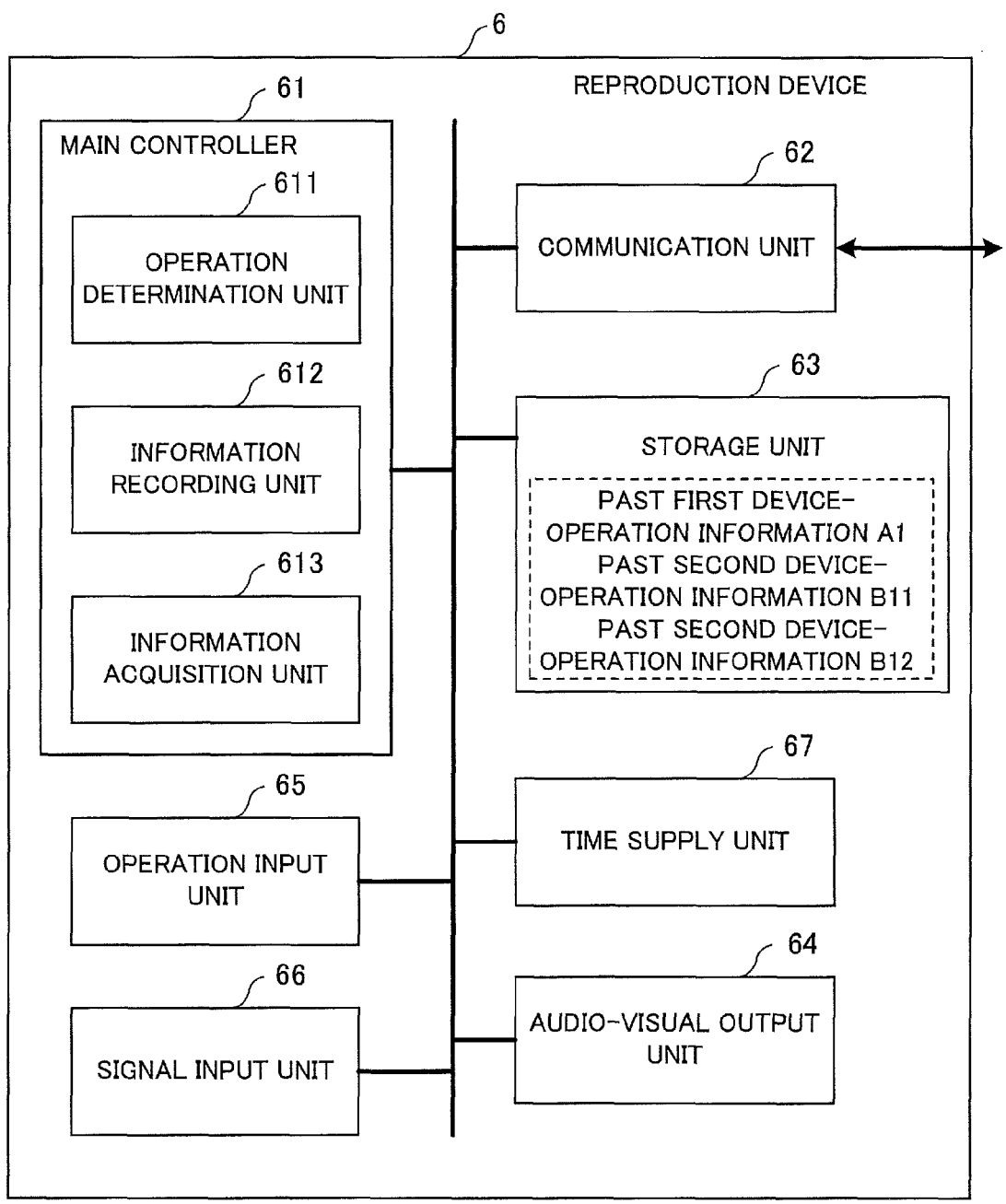
FIG. 11 is a block diagram schematically showing the configuration of the reproduction device shown in FIG. 10.

FIG. 11 is a block diagram schematically showing the configuration of the reproduction device (first television set) 6 shown in FIG. 10. As shown in FIG. 11, the reproduction device 6 includes a main controller 61 configured to control the operation of the entire device, a communication unit 62, and a storage unit 63 configured to store information. The main controller 61 includes an operation determination unit 611, an information recording unit 612, and an information acquisition unit 613. The communication unit 62 performs communication via the communication network 3 with the second television set 7 and the extractor fan 8 connected to the communication network 3. The reproduction device 6 may include, for example, an audio-visual output unit 64 configured to output video, sound, or the like and an operation input unit 65 operated for inputting a user command. The reproduction device 6 further includes a signal input unit 66 to which a broadcast signal, an external signal, or the like are inputted and a time supply unit 67 configured to supply current time information. The current time information may include not only time information but also date information and day-of-week information.

The operation determination unit 611 performs a process for determining current first device-operation information A0 indicating the operation currently performed by the reproduction device 6. In cases where the current first device-operation information A0 includes the volume level, the operation determination unit 611 performs a process for calculating the volume level which is the current first device-operation information A0 indicating the operation currently performed by the reproduction device 6. The information recording unit 612 performs a process for storing the current first device-operation information A0 determined by the operation determination unit 611 and current second device-operation information B01, B02 received by the communication unit 62 at that time in the storage unit 63 while associating the current first device-operation information A0 and the current second device-operation information B01, B02 with each other, or a process for updating the information stored in the storage unit 63. The information acquisition unit 613 performs a process for acquiring past first device-operation information A1 and past second device-operation information B11, B12 stored in the storage unit 63. Incidentally, the current first device-operation information A0 and the current second device-operation information B01, B02 stored in the storage unit 63 have become past information after the passage of time, and thus are described as past first device-operation information A1 and past second device-operation information B11, 312 at the time point of being read out.

The operation determination unit 611 performs a process for acquiring the current second device-operation information B01, B02 via the communication unit 62, a process for selecting past second device-operation information B11a, 312a having maximum similarity concerning the current second device-operation information B01, B02 acquired via the communication unit 62 from the past second device-operation information B11, B12 acquired from the storage unit 63 by the information acquisition unit 613, and a process for determining or calculating current first device-operation information A0 indicating the current operation of the reproduction device 6 based on past first device-operation information A1 which is first device-operation information stored in the storage unit 63 while being associated with the selected past second device-operation information B11a, B12a.

Figure 12:
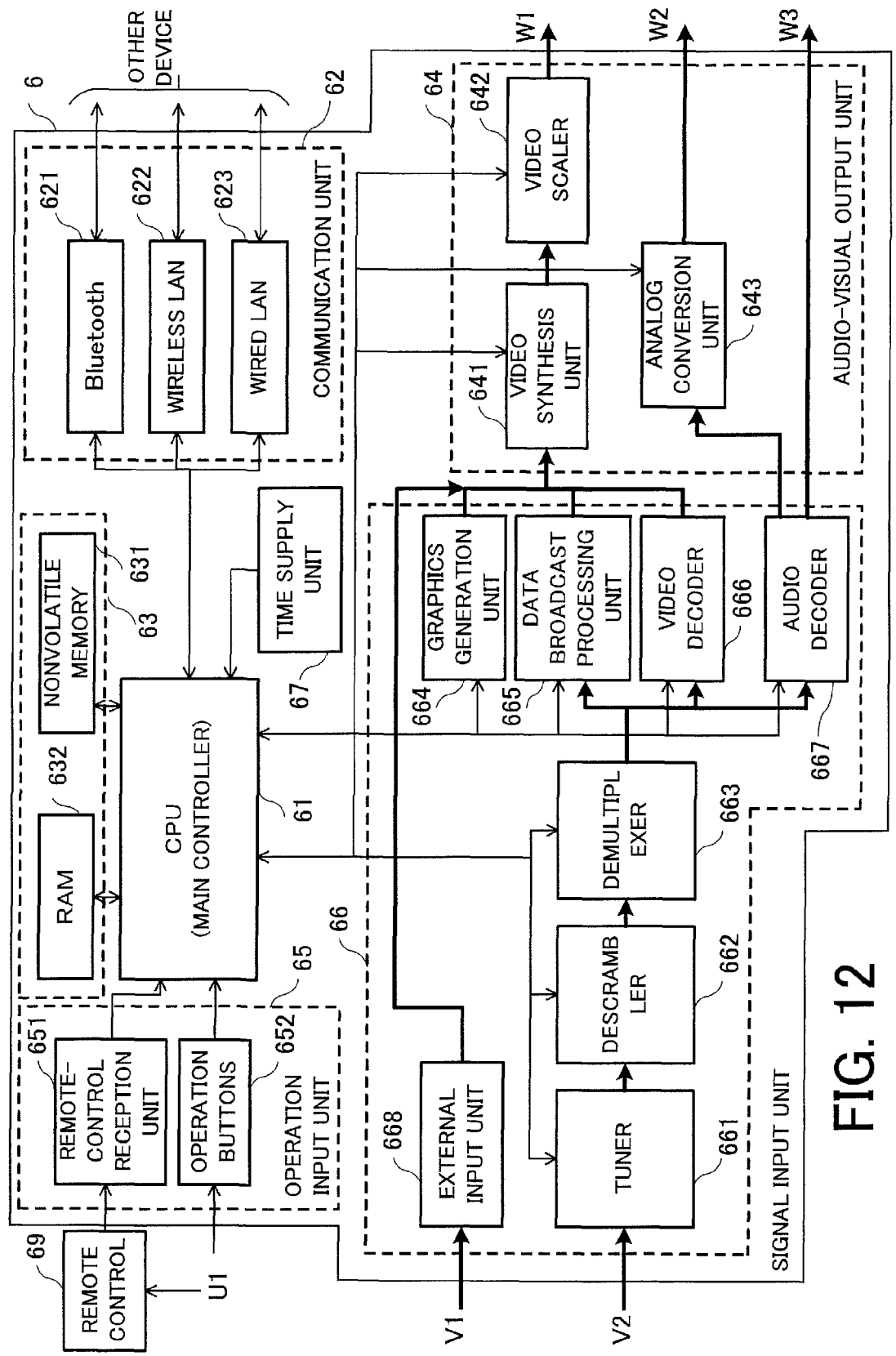
FIG. 12 is a block diagram showing the configuration of the reproduction device shown in FIG. 11.

FIG. 12 is a block diagram showing the configuration of the reproduction device (first television set) 6 shown in FIG. 11. As shown in FIG. 12, the reproduction device 6 according to the third embodiment includes a CPU (central processing unit) as the main controller 61 configured to control the operation of the entire reproduction device 6, a RAM (random access memory) 632 configured to store data when software is executed, a nonvolatile memory 631 configured to store data such as software, the communication unit 62 which is used at the time of communication with the second devices and the like, and the operation input unit 65 for inputting the user command to the reproduction device 6. The RAM 632 and the nonvolatile memory 631 constitute the storage unit 63. The reproduction device 6 further includes the signal input unit 66 to which a broadcast signal, an external signal, or the like are inputted and decode the broadcast signal, the audio-visual output unit 64 configured to output a video signal and an audio signal generated by the decoding, and the time supply unit 67 configured to supply the current time information.

The main controller 61 controls components in the reproduction device 6 so that a broadcast signal V2 inputted to the reproduction device 6 is decoded and video information, audio information, and additional information based on the decoded broadcast signal can be supplied to the user.

The signal input unit 66 includes a tuner 661 configured to take the inputted broadcast signal V2 into the reproduction device 6, a descrambler 662 configured to decrypt an encrypted broadcast signal received from the tuner 661, and a demultiplexer 663 configured to select a video signal, an audio signal, and an additional signal such as a data broadcast signal from an unencrypted broadcast signal decrypted by the descrambler 662. The signal input unit 66 further includes a video decoder 666 configured to decode the video signal selected by the demultiplexer 663 and convert the video signal into the original video information, an audio decoder 667 configured to decode the audio signal selected by the demultiplexer 663 and convert the audio signal into an original audio signal W3, a data broadcast processing unit 665 configured to generate data broadcast picture information from the data broadcast signal selected by the demultiplexer 663, a graphics generation unit 664 configured to generate a graphics picture for performing user operations, and an external input unit 668 to which an external signal V1 such as a video signal and an audio signal are inputted from the outside.

The audio-visual output unit 64 includes a video synthesis unit 641, a video scaler 642, and an analog conversion unit 643. The video synthesis unit 641 synthesizes video information by selectively superimposing together one or more of the video information generated by the video decoder 666, the video information inputted via the external input unit 668, the data broadcast picture information generated by the data broadcast processing unit 665, and the graphics picture information generated by the graphics generation unit 664. The video scaler 642 converts the video information generated by the synthesis process by the video synthesis unit 641 into a desired-output-formatted signal W1. The analog conversion unit 643 converts digital audio information from the audio decoder 667 and the external input unit 668 into an analog audio signal W2.

The communication unit 62 is a component for enabling the reproduction device 6 to communicate with the second device. The communication unit 62 includes, for example, a Bluetooth communication unit 621 for performing short-range wireless communication, a wireless local area network (LAN) communication unit 622, and a wired LAN communication unit 623. The communication unit 62 may be composed of one or two of the Bluetooth communication unit 621, the wireless LAN communication unit 622, and the wired LAN communication unit 623, or may further include a communication unit which conforms to a different communication standard. The Bluetooth communication unit 621 performs wireless communication with the second device within a short distance in accordance with the Bluetooth standard (registered trademark). The wireless LAN communication unit 622 makes a connection with other wireless LAN device in a one-to-one correspondence or a one-to-multiple correspondence and performs wireless communication. The wired LAN communication unit 623 is connected with other wired LAN device via an Ethernet cable and performs communication.

The communication unit 62 is capable of communicating the first device-operation information on the reproduction device 6, the second device-operation information on the second device, or the like. For example, among home electric appliances supporting HEMS are configured to optimize the amount of energy used and consumed in a house by communicating operation information regarding the amount of energy used. In this case, information concerning the operation, such as information regarding whether each device is in operation or stopped, is also communicated. Between a Bluetooth device outputting an audio signal and a Bluetooth speaker receiving an audio signal and outputting sound, a configuration for communicating information concerning the operation of one or both of the devices may be employed.

The operation input unit 65 includes an operation button 652 for directly inputting a user command to the reproduction device 6, a remote control 69 for remotely inputting a user command, and a remote-control reception unit 651 for receiving the contents of the operations on the remote control 69. However, the configuration of the operation input unit 65 is not limited to the example shown in FIG. 12, and other configurations, such as a configuration including only the operation button 652 or a configuration including only the remote-control reception unit 651 for receiving a signal from the remote control 69, may also be employed as long as the user command can be inputted. It is also possible to employ a configuration in which user operation information from the remote control 69 is received via the communication unit 62.

The time supply unit 67 may either be configured to have a clock function or to acquire time information from a broadcast signal or a second device via the communication unit 62 as long as the current time information is supplied to the CPU (main controller) 61.

FIG. 13 is a diagram showing an example of the operation information stored in the storage unit 63 of the reproduction device 6 shown in FIG. 11. As shown in FIG. 13, the storage unit 63 stores, for example, the past first device-operation information A1 and the past second device-operation information B11, B12 while associating them with each other. In the example of FIG. 13, pieces of operation information in the same row are pieces of information associated with each other. The larger the numerical value of the volume level is, the larger the volume level is. The example of FIG. 13 is just an example, and the information stored in the storage unit 63 may include other operation information (e.g., one or more of user identification information, time information (including date information and day-of-week information), and user operation information).

FIG. 14 is a flowchart showing a startup process performed by the main controller 61 of the reproduction device 6 according to the third embodiment. When a user command for turning on the power is inputted from the operation input unit 65 and a startup command is inputted to the reproduction device 6 (step S21), the main controller 61 of the reproduction device 6 executes an initialization process for starting the functions of the reproduction device 6 (step S22). The initialization process includes, for example, a process of initializing hardware such as the tuner 661 and the descrambler 662 for receiving the broadcast signal and the video decoder 666 and a process of initializing software in which software programs necessary for the operation of the main controller 61 are made executable by transferring the software programs from the nonvolatile memory 631 to the RAM 632.

Subsequently, the main controller 61 sets the operation currently performed by the reproduction device 6 by setting the first device-operation information at a preset initial value (step S23). The preset initial value is set as follows: For example, it is possible to record the first device-operation information at the previous startup of the reproduction device 6 in the nonvolatile memory 631 before turning off the power of the reproduction device 6 and set the value of the recorded first device-operation information as the initial value of the first device-operation information at the current startup of the reproduction device 6, or it is possible to set a value included in a startup command inputted by the user through the operation input unit 65 as the initial value of the first device-operation information at the current startup of the reproduction device 6. The first device-operation information includes an audio setting such as the volume level of the audio reproduction on the reproduction device 6, a video setting such as luminance of the video reproduction, settings regarding the types of input signals, the types of broadcast waves, broadcast stations to be selected, and so forth.

Subsequently, the main controller 61 of the reproduction device 6 judges whether there exists the second device capable of communicating with the reproduction device 6 (step S24). If a device capable of communicating with the reproduction device 6 exists, the main controller 61 of the reproduction device 6 acquires the second device-operation information on the second television set 7 and the extractor fan 8 that are the second devices capable of communicating with the reproduction device 6 (step S25). The steps S24 and S25 are repeated for the number of times equal to the number of the second devices capable of communicating with the reproduction device 6. If there exists no other second device capable of communicating with the reproduction device 6, the main controller 61 of the reproduction device 6 advances the process to step S26. The process performed by the main controller 61 of the reproduction device 6 for checking the presence and the absence of the second device capable of communicating with the reproduction device 6 may either be a process of finding the second device actually existing on the communication network 3 via the communication unit 62 or a process of checking only the presence of the second device previously registered as an object of connection. For example, the wireless LAN communication unit 622 or the wired LAN communication unit 623 employing the communication protocol TCP/IP can achieve the finding of the second device existing on the communication network 3 by sending out a simultaneous notification command (broadcast packet) specified by the communication protocol to the communication network 3. In the case where the second device as an object of connection has been registered previously, it is possible to check the presence of the second device by attempting to start communicating with the IP address of the second device as an object of connection and acquiring the second device-operation information on the applicable second device when the starting of the communication is successful.

Subsequently, the main controller 61 of the reproduction device 6 records the first device-operation information on the reproduction device 6 set in the step S23 and the second device-operation information acquired in the step S25 in the storage unit 63 while associating them with each other (step S26). The storage unit 63 includes the volatile RAM 632 in which data disappear when the electric power is not supplied thereto and the nonvolatile memory 631 capable of storing data even when the electric power is not supplied thereto. In the step S26, it is desirable to configure the device to record the first device-operation information on the reproduction device 6 and the second device-operation information in the nonvolatile memory 631 in cases where the recorded first device-operation information and second device-operation information are used even after the power of the reproduction device 6 is turned on and off. In cases where the first device-operation information on the reproduction device 6 and the second device-operation information are recorded frequently, the first device-operation information and the second device-operation information may be recorded in the volatile RAM 632 having the great upper limit number of times of recording and a high recording speed.

When the first device-operation information on the reproduction device 6 and the second device-operation information on the second television set 7 and the extractor fan 8 are recorded in the storage unit 63 in the step S26, at least one of user operation information indicating that the recording process is performed caused by the input of the startup command by the user operation, time information indicating the time when the startup command was inputted by the user operation, and time information indicating the time when the reproduction device 6 performs the recording process of recording the first device-operation information and the second device-operation information in the storage unit 63 may be recorded while being associated with the first device-operation information and the second device-operation information.

When there exists no second device capable of communicating with the reproduction device 6 in the step S24, information indicating that there exists no second device capable of communicating with the reproduction device 6 as the second device-operation information may be recorded while being associated with the first device-operation information in the step S26.

By executing the startup process of the reproduction device 6 in accordance with the processing of the steps S21 to S26 in this way, the reproduction device 6 can store the current first device-operation information on the reproduction device 6 and the second device-operation information on the second device capable of communicating with the reproduction device 6 after the execution of the startup process of the reproduction device 6.

Figure 15:
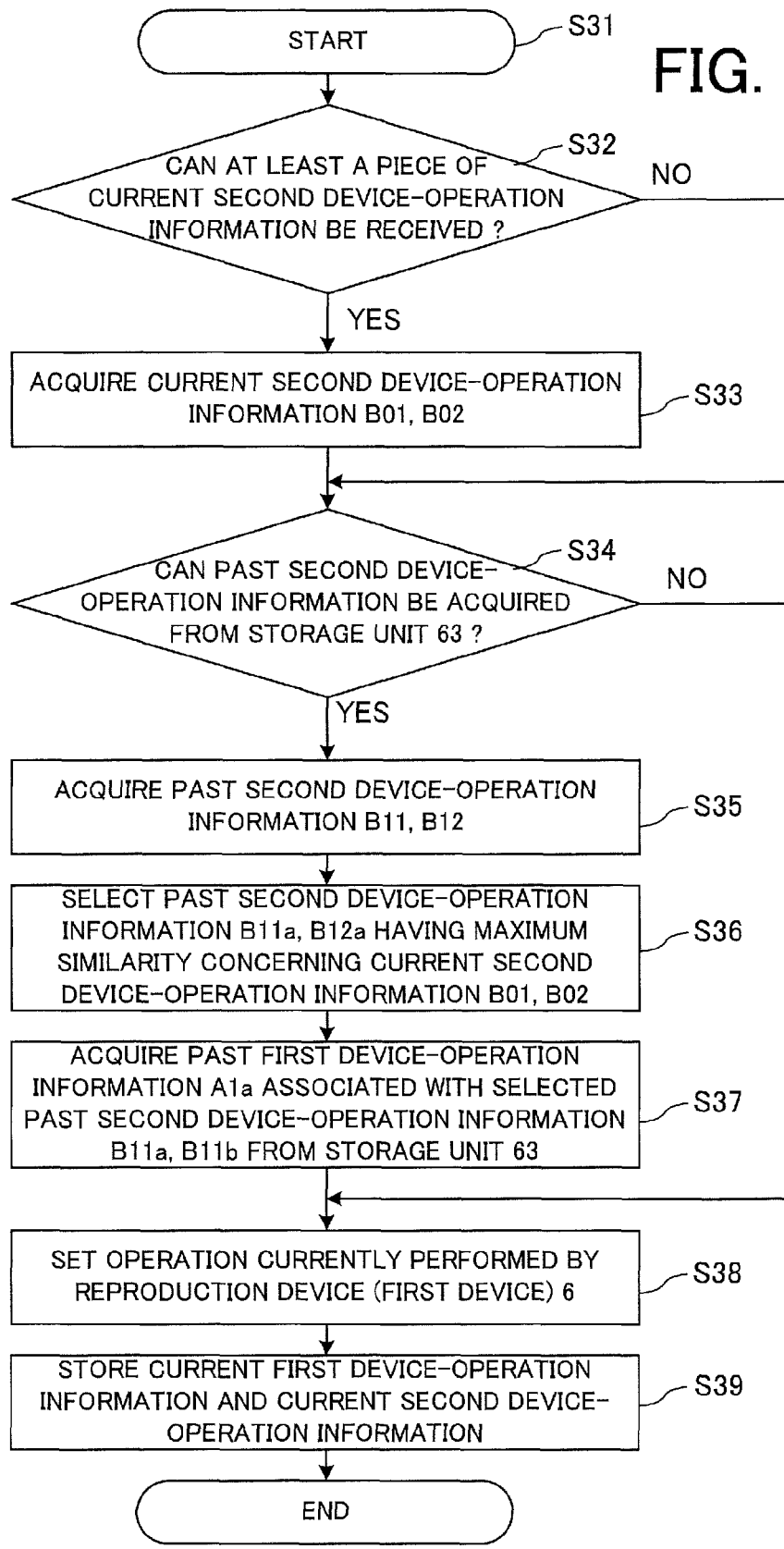
FIG. 15 is a flowchart showing a process for calculating the first device-operation information executed by a main controller of the reproduction device according to the third embodiment.

FIG. 15 is a flowchart showing a process for calculating the first device-operation information executed by the main controller 61 of the reproduction device 6 according to the third embodiment. In FIG. 15, when the process for calculating the first device-operation information is started (step S31), the reproduction device 6 checks whether the second device-operation information indicating the operation currently performed by the second device (other device) can be received or not (step S32). The reproduction device 6 advances the process to step S34 when all the second device-operation information indicating the operation currently performed by the second device capable of communicating with the reproduction device 6 has been acquired in the startup process (steps S24 and S25 in FIG. 14) and there is no subsequent notification of update of the current second device-operation information from the second device, or when all the second device-operation information on the second device capable of communicating with the reproduction device 6 is acquired in the next step S33 and there is no subsequent notification of update of the current second device-operation information from the second device. In cases other than the above cases where there is no notification of update, that is, in cases where at least part of the second device-operation information capable of communicating with the reproduction device 6 has not been acquired yet, the reproduction device 6 acquires the current second device-operation information B01, B02 (step S33).

After acquiring the current second device-operation information B01, B02 in this way, the reproduction device 6 judges whether the past second device-operation information can be acquired from the storage unit 63 (step S34). In cases where the second device-operation information has not been recorded even once in the startup process of FIG. 14, step S39 in FIG. 15, or the like, the operation determination unit 611 of the reproduction device 6 judges that it is impossible to calculate the first device-operation information by referring to the past second device-operation information and advances the process to step S38. In cases where the second device-operation information on the second device was recorded at least once before this point in time, the operation determination unit 611 acquires the past second device-operation information 311, 312 on the second device(s) from the storage unit 63 (step S35).

By performing the process to the step S35, the reproduction device 6 can acquire the current second device-operation information B01, B02 on second devices capable of communicating with the reproduction device 6 and at least one piece of the past second device-operation information B11, B12. Subsequently, the reproduction device 6 compares the current second device-operation information B01, B02 on the second devices capable of communicating with the reproduction device 6 with the past second device-operation information B11, B12 and thereby selects past second device-operation information B11a, B12a having maximum similarity concerning the current second device-operation information on the second devices (step S36). The selection of operation information having maximum similarity to each other is made by, for example, defining a distance function of the current second device-operation information and the past second device-operation information and performing calculations for selecting operation information with which the smallest value is obtained from the distance function.

The distance function of the current second device-operation information and a particular piece of the past second device-operation information can be defined like the distance function Dx(a) in the following expression (1), for example:

$$D_x(a) = \{r_1^*(Pa_1-Pn_1)^2 + r_2^*(Pa_2-Pn_2)^2 + \ldots + r_k^*(Pa_k-Pn_k)^2\}^{1/2} \quad (1)$$

where $Pn=(Pn_1, Pn_2, \ldots, Pn_k)$ represents the current second device-operation information, $Pa=(Pa_1, Pa_2, \ldots, Pa_k)$ represents the past second device-operation information, $r=(r_1, r_2, \ldots, r_k)$ represents weight coefficients for the elements of the operation information, and k represents an integer larger than or equal to 1.

All the elements constituting the current second device-operation information correspond to any of the elements $Pn_1, Pn_2, \ldots, Pn_k$ of the current second device-operation information Pn and to any of the elements $Pa_1, Pa_2, \ldots, Pa_k$ of the particular piece of the past second device-operation information Pa. By using the distance function Dx(a) determined as above, relationship between the current second device-operation information and the particular piece of the past second device-operation information can be calculated as a scalar value. Even when there are multiple pieces of the acquirable past second device-operation information, a piece of the past second device-operation information minimizing the scalar value can be selected and a piece of the past second device-operation information having maximum similarity can be selected.

Incidentally, while the elements of the current second device-operation information Pn and the elements of the past second device-operation information Pa are configured to include at least the second device-operation information, the processing in the step S36 can be simplified by configuring the elements to include the first device-operation information, user setting information, and so forth. in association with the second device-operation information, by appropriately setting the weight coefficients r for the elements based on the contents of the user setting information or the time information, and so forth. For example, in order to raise the priority of the past second device-operation information closer to the current time, a distance function Dy(a) may be defined as in the following expression (2), for example:

$$D_y(a) = D_x(a)^* \{1 + r_t^*(Pa_t-Pn_t)^2\} \quad (2)$$

where $Pn_t$ represents the time information on the current second device-operation information, $Pa_t$ represents the time information on operation information at a past time "a" (operation information at a certain time), and $r_t$ represents a weight coefficient for the time information.

Here, assume the time information $Pn_t$ on the current second device-operation information Pn is set at any of the time information indicating time in 24 hours of one day excluding information concerning the date and is inputted to the distance $D_y$, and assume the time information $Pa_t$ on the particular piece of the past second device-operation information Pa is also inputted in the same way. In this case, when there exist two particular pieces of the past second device-operation information similar to the current second device-operation information and their elements other than the aforementioned pieces of the time information are identical with each other, one of the two particular pieces of past second device-operation information closer to the current time information makes the distance $D_y$ smaller and is handled as the object of the selection. In this way, the volume level of the reproduction device 6 can be set at an appropriate value in consideration of sound caused by the surrounding environment other than the sound caused by the operation of the second device capable of communicating with the reproduction device 6. In general, the noise level of the surrounding environment is high in the daytime and low in the middle of the night. In cases where the volume level of the reproduction device 6 is set by the user, there are influencing factors other than the sound caused by the operation of the second device capable of communicating with the reproduction device 6. By referring to the time information with which operation information is recorded, more appropriate past second device-operation information can be selected.

Similarly, by configuring the time information $Pn_t$ on the device-operation information Pn so that the distance $D_y$ becomes small and reconfiguring the definition of the distance $D_y$ as necessary so as to select the same day of week or a similar season, more appropriate information can be selected as the past second device-operation information when the day of week is the same or the year/month/day is close concerning the time information $Pn_t$ on the current second device-operation information Pn. Since the lifestyle generally differs between weekdays from Monday to Friday or Saturday and day(s) off at the weekend, the change in the noise level caused by various factors in house with the passage of time tends to differ between the weekdays and the day(s) off and the value optimizing the reproduction volume level of the reproduction device 6 can vary even in cases where the time of day is the same. By making the selection so as to select past second device-operation information on the same day of the week, the reproduction volume level of the reproduction device 6 can be set at a value optimum for the current time of day in consideration of the difference among the days of week. In the same way, with regard to similar seasons, by making the selection so as to select past second device-operation information on the same season, the reproduction volume level of the reproduction device 6 can be set at a value optimum for the current time of day in consideration of the difference among seasons.

In cases where there are multiple pieces of information in which the past second device-operation information is identical with each other and the user operation information recorded in association with the past second device-operation information differs from each other, selecting the past second device-operation information recorded after update of the user operation information makes it possible to set the first device-operation information that is optimally set by the user according to the operating status of the second device. In cases where the sound caused by the operation of the second devices interferes in the house, once the volume level of the reproduction device 6 is set at an appropriate value by the user, the volume level of the reproduction device 6 can thereafter be set automatically at the optimum value when the second device-operation information on the second device becomes the same.

After a particular piece of past second device-operation information having maximum similarity concerning the current second device-operation information is selected in the step S36 in this way, the first device-operation information that was recorded while being associated with the past second device-operation information when the applicable past second device-operation information was recorded is acquired from the storage unit 63 in the next step S37. In cases where the first device-operation information is also used for the selection in the step S36, the applicable first device-operation information has already been acquired from the storage unit 63, and thus it is unnecessary to record the first device-operation information in the storage unit 63 again.

Subsequently, in the step S38, the reproduction device 6 calculates the first device-operation information and sets the operation of the reproduction device 6 according to the calculated first device-operation information. For example, by calculating the first device-operation information in the step S37 so as to be identical with the past first device-operation information when the acquired past second device-operation information has maximum similarity, there is a high possibility of successfully setting the most appropriate first device-operation info/motion according to the second device-operation info/motion capable of communicating with the reproduction device 6 because actual results with the past first device-operation information are applied and used.

Further, in cases where the user command has been inputted before the calculation of the first device-operation information in the step S38, by not calculating the first device-operation information in the step S37 so as to be totally identical with the past first device-operation information when the acquired past second device-operation info/motion has maximum similarity and by controlling the operation information changed by the user operation so that the operation is not changed sharply, it is possible to prevent sharp change in the operation of the reproduction device 6 caused by a change in the first device-operation information and to achieve a comfortable operational environment.

In the next step S39, the reproduction device 6 records the current second device-operation information on the second devices acquired before the step S34 and the current first device-operation information on the reproduction device 6 calculated in the step S38 in the storage unit 63. If the start of the calculation of the first device-operation information in FIG. 15 is due to the input of a user command, the user operation information can be configured so as to be recorded while being associated with the first device-operation information. Further, when the time information has been inputted from the time supply unit 67, the time information may be recorded while being associated with the first device-operation information.

Incidentally, while the reproduction device 6 in the step S39 newly records updated elements of operation information, the recording of non-updated elements of operation information may either be done by directly recording the non-updated elements or by recording the fact that there was no update. In cases where the number of elements of operation information is extremely large and the number of updated elements of the operation information is small, the recording of the fact about the non-updated elements that there was no update can in some cases reduce the capacity of the storage unit 63 necessary for recording the operation information, which allows the storage unit 63 to be configured of a low-capacity memory even in cases where frequent recording of operation information is necessary.

By executing the startup process of the reproduction device 6 in accordance with the processing of the steps S31 to S39 in this way, appropriate first device-operation information on the reproduction device 6 can be calculated in consideration of the past second device-operation information.

Figure 16:
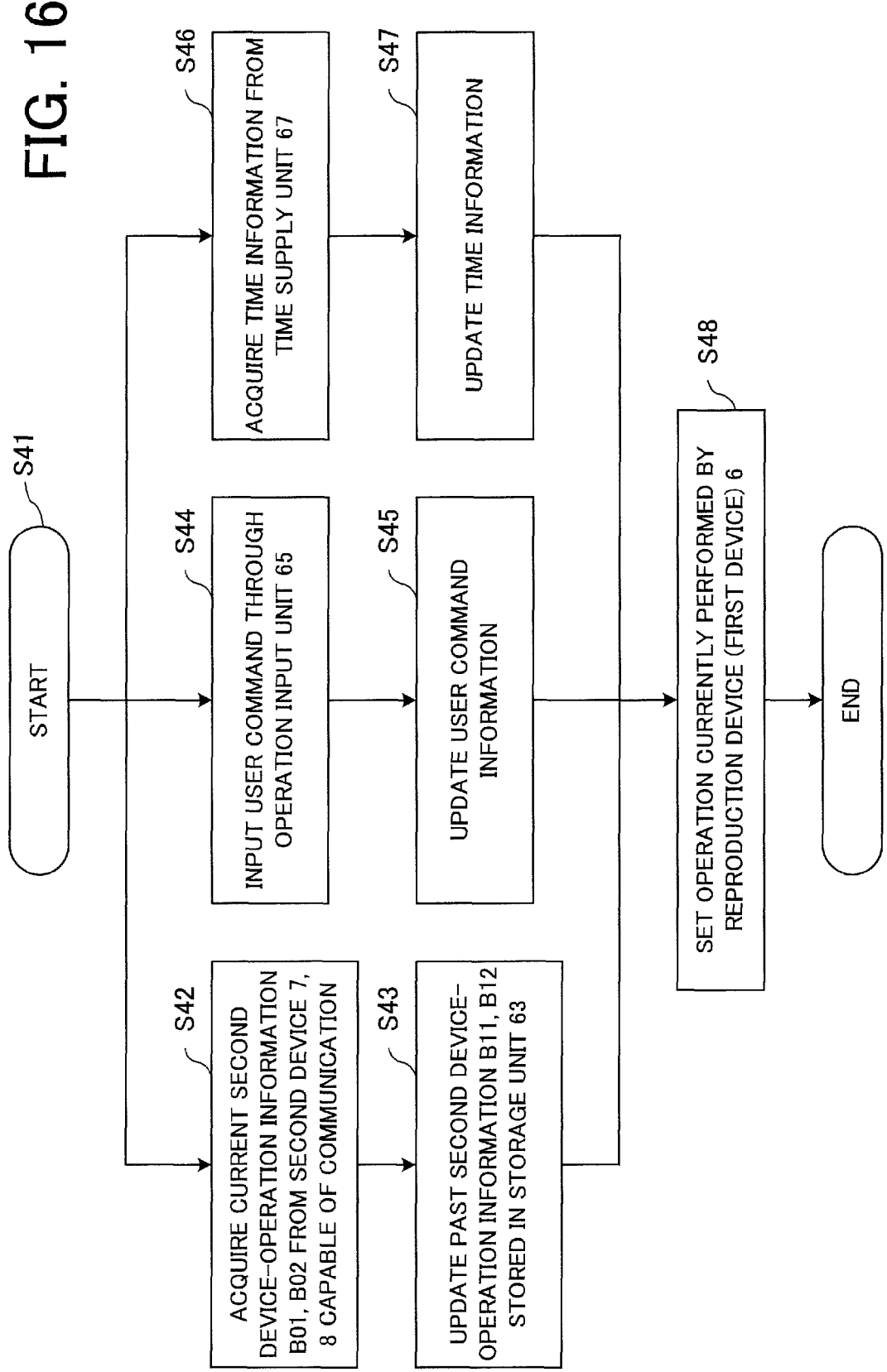
FIG. 16 is a flowchart showing a process to a calculation process of the first device-operation information by the reproduction device according to the third embodiment shown in FIG. 15.

FIG. 16 is a flowchart showing a process to a calculation process (step S48) of the first device-operation information by the reproduction device according to the third embodiment shown in FIG. 15. Factors causing the start of updating the first device operation status shown in FIG. 15 include, for example, processing of step S42, processing of step S44 and processing of step S46 in FIG. 16. The step S42 represents a case where there is a notification of the second device-operation information from one, some or all of the plurality of the second devices capable of communicating with the reproduction device 6 or a case where the second device-operation information is acquired caused by a process of the reproduction device 6. The step S44 represents a case where a user command is inputted by a user operation through the operation input unit 65. The step S46 represents a case where a change in the first device-operation information is made as internal processing of the reproduction device 6 caused by the supply of the time information from the time supply unit 67.

When there is a notification of the second device-operation information of the applicable device(s) from one, some or all of the second devices capable of communicating with the reproduction device 6 or the second device-operation information is acquired owing to a process of the reproduction device 6 in the step S42, the second device-operation information on the applicable second device(s) is updated in step S43 and then the update of the first device operation status shown in FIG. 15 is conducted in the step S48.

When some kind of user operation is performed through the operation input unit 65 and the user operation is inputted in the step S44, the user operation information is updated in step S45 and then the update of the first device operation status shown in FIG. 15 is conducted in the step S48.

When some kind of operation involving a change in the first device-operation information, such as update of the time information, is performed as internal processing of the reproduction device 6 in the step S46, the time information or the applicable first device-operation information is updated in step S47 and then the update of the first device operation status shown in FIG. 15 is conducted in the step S48.

By executing the startup process of the reproduction device 6 in accordance with the processing of the steps S41 to S48 in this way, a variety of operation information at each of the time points can be recorded in the storage unit 63 by defining various factors such as a change in the operation of the reproduction device 6, a change in the operation of the second device capable of communicating with the reproduction device 6, a user input, and time information as starting points. By recording operation information in various situations and recording optimum first device-operation information in which the user command at that time or the like is incorporated while associating the optimum first device-operation information with the operation information, it is possible, even on the occurrence of various situations, to select optimum operation information in a similar situation in the past, calculate the first device-operation information, and determine an operation of the reproduction device 6 which is judged to be the most appropriate among examples in the past.

Incidentally, the steps S42, S44, and S46 in FIG. 16 are examples of cases where the reproduction device 6 records operation information in the storage unit 63 as past second device-operation information. It is also possible to add other cases where the reproduction device 6 records operation information in the storage unit 63 as past second device-operation information, or it is also possible to reduce the operation information recorded by the reproduction device 6 in the storage unit 63 as past second device-operation information in cases where the capacity of the storage unit 63 is small.

Even when the reproduction device 6 has recorded the operation information in the storage unit 63 as past second device-operation information, by deleting old operation information after the elapse of a predetermined period or by extracting and deleting operation information whose number of times of being selected in a predetermined period is within a predetermined value, it is possible to use a memory of a small storage capacity as the storage unit 63 and contribute to price reduction of the reproduction device 6.

FIG. 17 is a sequence diagram schematically showing an example of the operation of the control system shown in FIG. 10. The reproduction device 6 is capable of receiving the user command inputted from the remote control 69 and acquiring second device-operation information which is the operation information on the second television set 7 and the extractor fan 8 as the second devices (other devices). In FIG. 17, when a startup command "turning on the power of the reproduction device 6" is inputted by the remote control 69 (time t21), the reproduction device 6 starts up by performing a predetermined initialization process (step S51). In this case, the reproduction device 6 sets the initial value of the first device-operation information to the volume level 5 at the previous startup, for example, and acquires second device-operation information indicating that the second television set 7 and the extractor fan 8 are in the power-off state. Incidentally, the larger the numerical value of the volume level is, the larger the volume of the outputted sound is.

Subsequently, when a user command indicating "change the volume level of the reproduction device 6 to 10" is inputted by the remote control 69 (time t22), the reproduction device 6 calculates the volume level as the first device-operation information according to the processing for calculating the first device-operation information shown in FIG. 15. For example, when no second device-operation information similar to the applicable user operation information is found in the past second device-operation information stored in the storage unit 63 prior to this time point, the reproduction device 6 outputs the volume level 10 as commanded by the user command and the volume level 10 is continued (step S52).

Subsequently, when a notification indicating that "power of the second television set 7 has been turned on" is received from the second television set 7 (time t23), the reproduction device 6 calculates an appropriate volume level. The reproduction device 6 cannot find second device-operation information identical with the applicable user operation information in the past second device-operation information stored in the storage unit 63 prior to this time point, judges that the operation information recorded the last time (at the time t22) has maximum similarity, calculates the volume level 10 of the reproduction device 6 at that time, and the volume level 10 is continued (step S53).

Subsequently, after the power of the second television set 7 is turned on, a user command indicating "change the volume level of the reproduction device 6 to 15" is inputted by the remote control 69 (time t24). This can be presumed to be an operation performed by the user of the reproduction device 6 to make it easy to hear the sound from the reproduction device 6 since the power of the second television set 7 has been turned on. Since second device-operation information identical with the applicable user operation information cannot be found in the past second device-operation information stored in the storage unit 63 prior to this time point (time t24) and the calculation of the first device-operation information is just after a user operation, the reproduction device 6 gives priority not to the similarity judgment but to the user command, calculates the volume level 15 as commanded by the user command, and changes the volume level to 15 (step S54).

Subsequently, when a notification indicating that "power of the extractor fan 8 has been turned on" is received from the extractor fan 8 (time t25), the reproduction device 6 calculates an appropriate volume level in step S55. The reproduction device 6 cannot find second device-operation information identical with the applicable user operation information in the past second device-operation information stored in the storage unit 63 prior to this time point, judges that the operation information recorded the last time (time t24) has maximum similarity, calculates the volume level 15 of the reproduction device 6 at that time, and continues the volume level 15 (step S55).

Subsequently, after the power of the extractor fan 8 is turned on, a user command indicating "change the volume level of the reproduction device 6 to 20" is inputted by the remote control 69 (time t26). This can be presumed to be an operation performed by the user of the reproduction device 6 to make it easy to hear the sound from the reproduction device 6 since the power of the extractor fan 8 has been turned on. While the reproduction device 6 calculates an appropriate volume level, second device-operation information identical with the applicable user operation information cannot be found in the past second device-operation information stored in the storage unit 63 prior to this time point (time t26) and the calculation of the first device-operation information is just after a user operation. Thus, the reproduction device 6 calculates the volume level 20 as commanded by the user command, and continues the volume level 20 (step S56).

Subsequently, when a notification indicating that "power of the extractor fan 8 has been turned off" is received from the extractor fan 8 (time t27), the reproduction device 6 calculates an appropriate volume level in step S57. The power of the second television set (second device) 7 is on, and the power of the extractor fan 8 is off, and as second device-operation information identical to this, the reproduction device 6 can find the operation information recorded just after the step S53 and the operation information recorded just after the step S54. Further, the reproduction device 6 judges that the step S54 in this state is operation information recorded after a user command by the remote control 69 and is operation information closer to the optimum in comparison with the operation information recorded just after the step S53, and thus selects the operation information recorded just after the step S54. Since the volume level of the reproduction device 6 at that time is 15, the reproduction device 6 calculates the volume level 15 and automatically changes the volume level to the calculated volume level 15 (step S57). In this way the reproduction device 6 is capable of automatically making the optimum volume level setting without the need of a user command by the remote control 69.

Subsequently, when a notification indicating that "power of the second television set 7 has been turned on" is received from the second television set 7 (time t28), the reproduction device 6 calculates an appropriate volume level. The second television set 7 and the extractor fan 8 capable of communicating with the reproduction device 6 are both in the power off, and as second device-operation information identical to this, the reproduction device 6 can find the operation information recorded just after the step S51 and the operation information recorded just after the step S52. Similarly to the case of calculating the volume level of the reproduction device 6 in the step S57, the reproduction device 6 selects operation information recorded after a user command, that is, the operation information recorded just after the step S52. Since the volume level of the reproduction device 6 at that time is 10, the reproduction device 6 calculates the volume level 10 in step S57, and the main controller 61 of the reproduction device 6 automatically changes the volume level to the calculated volume level 10 (step S58).

In this way the reproduction device 6 records relevant operation information when the first device-operation information or the second device-operation information on the second device capable of communicating with the reproduction device 6 is inputted, when the user command from the remote control 69 is inputted, or the like. On the next occurrence of a similar situation, the reproduction device 6 is capable of controlling its operation based on the recorded operation information.

As described above, according to the reproduction device 6 and the reproduction method in the third embodiment, past second device-operation information E11*a*, B12*a* having maximum similarity concerning the current second device-operation information B0 acquired via the communication unit 62 are selected from the past second device-operation information B11, B12 stored in the storage unit 63, and the operation currently performed by the operation control device 1 is set based on the past first device-operation information A1*a* stored while being associated with the selected past second device-operation information B11*a*, B12*a*. Therefore, the operation of the reproduction device 6 can be set appropriately. For example, once the user of the reproduction device 6 sets an optimum value as setting of the volume level of the reproduction device 6, the volume level of the reproduction device 6 can be automatically set at the optimum value when a similar situation occurs later.

Further, in comparison with the conventional device that automatically changes the volume level to a predetermined low volume level (non-interference volume level), the reproduction device 6 and the reproduction method according to the third embodiment achieve an effect of preventing the occurrence of inconvenient situations in which the volume level accidentally drops too low and the sound from the reproduction device 6 becomes hard to hear.

MODIFICATIONS

Although volume control for a reproduction device has been mainly described in the above first through third embodiments, the present invention is applicable also to volume control for buzzer sound or synthetic voice of electronic devices such as microwave ovens.

Further, Although examples of automatic adjustment of the volume level of the reproduction device 6 have been described in the above first through third embodiments, the present invention is applicable also to adjustment of physical quantities other than the volume level as long as the purpose is to avoid situations in which interference occurs between closely arranged multiple electronic devices. For example, the present invention is applicable also to operation control in which the luminance level of a display screen of the reproduction device 6 is changed depending on current and past operation status of a room illumination device as the second device.

DESCRIPTION OF REFERENCE CHARACTERS

1: operation control device (first device, host device), 2: second device (other device), 3: communication network, 4: first device, 5: operation control device, 6: first television set (first device, reproduction device), 7: second television set (second device), 8: extractor fan (second device), 11, 51, 61: main controller, 12, 52, 62: communication unit, 13, 53, 63: storage unit, 14, 54: output unit, 15, 55, 65: operation input unit, 64: audio-visual output unit, 66: signal input unit, 67: time supply unit, 111, 511, 611: operation determination unit, 112, 512, 612: information recording unit, 113, 513, 613: information acquisition unit, 631: nonvolatile memory, 632: RAM, A0: current first device-operation information, A1: past first device-operation information, B0, B01, B02: current second device-operation information, B1, B11, B12: past second device-operation information.

What is claimed is:

1. An operation control device as a first device communicably connected to at least one second device, comprising:
   an operation determination unit configured to determine first device-operation information indicating an operation currently performed by the first device from among a plurality of operations performable by the first device;
   a communication unit configured to receive second device-operation information indicating an operation performed by the second device;
   a storage unit configured to store information;
   an information recording unit configured to store the first device-operation information determined by the operation determination unit and the second device-operation information received by the communication unit in the storage unit while associating the first device-operation information and the second device-operation information with each other; and
   an information acquisition unit configured to acquire the first device-operation information and the second device-operation information stored in the storage unit as past first device-operation information and past second device-operation information, wherein:
   the operation determination unit performs:
      a process of acquiring the second device-operation information received via the communication unit as current second device-operation information;
      a process of selecting past second device-operation information based on similarity between the current second device-operation information and the past second device-operation information acquired from the storage unit by the information acquisition unit; and
      a process of determining operation currently performed by the first device based on the past first device-operation information stored in the storage unit while being associated with the selected past second device-operation information, and
   the information recording unit is prompted to perform the process of storing the first device-operation information and the second device-operation information in the storage unit while associating the first device-operation information and the second device-operation information when either of the following occurs:
      the operation determination unit performs the process of determining the operation currently performed by the first device; and
      the communication unit receives the second device-operation information.

2. The operation control device according to claim 1, wherein the process of selecting the past second device-operation information is a process of selecting past second device-operation information having maximum similarity of similarity between the current second device-operation information and a piece of the past second device-operation information acquired from the storage unit by the information acquisition unit.

3. The operation control device according to claim 2, wherein the process of selecting the past second device-operation information having the maximum similarity concerning the current second device-operation information is a process of selecting past second device-operation information having a minimum distance value of distance values of the current second device-operation information and the past second device-operation information, the distance values of the current second device-operation information and the past second device-operation information being calculated by using a predetermined distance function.

4. The operation control device according to claim 3, wherein the at least one second device comprises a plurality of second devices, and
the operation determination unit performs:
  a process of acquiring the second device-operation information received via the communication unit as multiple pieces of current second device-operation information;
  a process of selecting past second device-operation information based on similarity between the multiple pieces of current second device-operation information and multiple pieces of past second device-operation information acquired from the storage unit by the information acquisition unit; and
  a process of determining the operation currently performed by the first device based on the past first device-operation information stored in the storage unit while being associated with the selected past second device-operation information.

5. The operation control device according to claim 4, further comprising an operation input unit configured to be operated for inputting a user command, wherein:
  the operation determination unit determines the operation currently performed by the first device based on the user command inputted from the operation input unit, and
  the information recording unit stores user operation information indicating contents of operation of the operation input unit, current first device-operation information indicating operation determined based on the user command, and current second device-operation information received by the communication unit in the storage unit while associating the user operation information, the current first device-operation information, and the current second device-operation information.

6. The operation control device according to claim 1, further comprising an output unit configured to output sound, wherein:
  the first device-operation information includes information concerning a volume level of the sound outputted from the output unit, and
  the operation determined by the operation determination unit includes determination of the volume level.

7. An operation control device as a first device communicably connected to at least one second device, comprising:
  an operation determination unit configured to determine first device-operation information indicating an operation currently performed by the first device;
  a communication unit configured to receive second device-operation information indicating an operation performed by the second device;
  a storage unit configured to store information;
  an information recording unit configured to store the first device-operation information determined by the operation determination unit and the second device-operation information received by the communication unit in the storage unit while associating the first device-operation information and the second device-operation information with each other; and
  an information acquisition unit configured to acquire the first device-operation information and the second device-operation information stored in the storage unit as past first device-operation information and past second device-operation information, wherein:
  the operation determination unit performs:
    a process of acquiring the second device-operation information received via the communication unit as current second device-operation information;
    a process of selecting past second device-operation information based on similarity between the current second device-operation information and the past second device-operation information acquired from the storage unit by the information acquisition unit; and
    a process of determining operation currently performed by the first device based on the past first device-operation information stored in the storage unit while being associated with the selected past second device-operation information,
  wherein the process of selecting the past second device-operation information is a process of selecting past second device-operation information having a minimum distance value of distance values of the current second device-operation information and the past second device-operation information, the distance values of the current second device-operation information and the past second device-operation information being calculated by using a predetermined distance function.

8. The operation control device according to claim 7, wherein when the information acquisition unit cannot acquire at least one of the past second device-operation information and the past first device-operation information from the storage unit, the operation determination unit makes the first device continue current operation.

9. The operation control device according to claim 8, wherein the operation determination unit determines the operation currently performed by the first device based on the past first device-operation information and the user operation information stored in the storage unit while being associated with the selected past second device-operation information.

10. The operation control device according to claim 8, wherein:
  the information recording unit stores user identification information for identifying a user who operated the operation input unit in the storage unit while associating the user identification information with the first device-operation information and the second device-operation information, and
  the operation determination unit determines the operation currently performed by the first device based on the past first device-operation information and the user identification information stored in the storage unit while being associated with the selected past second device-operation information.

11. The operation control device according to claim 8, further comprising a time supply unit configured to supply time information indicating current time, wherein:

the information recording unit stores the time information supplied by the time supply unit in the storage unit while associating the time information with the first device-operation information and the second device-operation information, and the operation determination unit determines the operation currently performed by the first device based on the past first device-operation information and the time information stored in the storage unit while being associated with the selected past second device-operation information.

12. An operation control device which is communicably connected to a first device and at least one second device and controls operation of the first device, the operation control device comprising:

a communication unit configured to receive first device-operation information indicating an operation performed by the first device and second device-operation information indicating an operation performed by the second device;

an operation determination unit configured to determine the operation performed by the first device and indicated by the received current first device-operation information;

a storage unit configured to store information;

an information recording unit configured to store the first device-operation information and the second device-operation information received by the communication unit in the storage unit while associating the first device-operation information and the second device-operation information with each other; and an information acquisition unit configured to acquire the first device-operation information and the second device-operation information stored in the storage unit as past first device-operation information and past second device-operation information, wherein:

the operation determination unit performs:

a process of acquiring the second device-operation information received via the communication unit as current second device-operation information;

a process of selecting past second device-operation information based on similarity between the current second device-operation information and the past second device-operation information acquired from the storage unit by the information acquisition unit; and a process of transmitting a command signal, for setting the operation of the first device based on the past first device-operation information stored in the storage unit while being associated with the selected past second device-operation information, to the first device via the communication unit, and the process of selecting the past second device-operation information is a process of selecting past second device-operation information having a minimum distance value of distance values of the current second device-operation information and the past second device-operation information, the distance values of the current second device-operation information and the past second device-operation information being calculated by using a predetermined distance function.

* * * * *